(12) United States Patent
Nakamura

(10) Patent No.: US 8,826,697 B2
(45) Date of Patent: Sep. 9, 2014

(54) METHOD OF MANUFACTURING PLATE MEMBER AND PLATE MEMBER

(75) Inventor: Toshihiro Nakamura, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 783 days.

(21) Appl. No.: 12/891,389

(22) Filed: Sep. 27, 2010

(65) Prior Publication Data

US 2011/0014428 A1    Jan. 20, 2011

Related U.S. Application Data

(63) Continuation of application No. PCT/JP2009/056349, filed on Mar. 27, 2009.

(30) Foreign Application Priority Data

Mar. 28, 2008 (JP) ................................. 2008-088605
May 23, 2008 (JP) ................................. 2008-135546
Jul. 11, 2008 (JP) ................................. 2008-181905

(51) Int. Cl.
*C03B 23/037* (2006.01)
*C03C 15/02* (2006.01)

(52) U.S. Cl.
CPC ............... *C03C 15/02* (2013.01); *C03B 23/037* (2013.01)
USPC ....................... 65/106; 65/31; 65/64

(58) Field of Classification Search
CPC .................................................. C03B 23/037
USPC ....................... 65/29.1, 31, 64, 106
See application file for complete search history.

(56) References Cited

U.S. PATENT DOCUMENTS

2007/0271957 A1* 11/2007 Nakamura et al. ............ 65/29.14
2008/0216515 A1*  9/2008 Kumada et al. ................... 65/64
2009/0113935 A1*  5/2009 Suzuki et al. ..................... 65/64

FOREIGN PATENT DOCUMENTS

| JP | 08-183627 | 7/1996 |
| JP | 11-199255 | 7/1999 |
| JP | 2002-086354 | 3/2002 |
| JP | 2003-192389 | 7/2003 |
| JP | 2004-067393 | 3/2004 |
| JP | 2004067393 A * | 3/2004 |
| JP | 2004-175607 | 6/2004 |
| JP | 2007-119290 | 5/2007 |
| WO | WO 2007049545 A1 * | 5/2007 |

OTHER PUBLICATIONS

Machine Translation of JP 2004-067393. Accessed Jun. 17, 2013. Patent originally published Mar. 4, 2004.*
Takahashi Kiyoshi, et al., "Photovoltaic Generation", Morikita Publication, 1979, p. 153 (with English translation).
U.S. Appl. No. 13/452,428, filed Apr. 20, 2012, Nakamura, et al.

* cited by examiner

*Primary Examiner* — Matthew Daniels
*Assistant Examiner* — Cynthia Szewczyk
(74) *Attorney, Agent, or Firm* — Oblon, Spivak, McClelland, Maier & Neustadt, L.L.P.

(57) ABSTRACT

There is provided a method of manufacturing a plate member including preparing a base plate member having main faces, and performing etching by immersing at least part of the base plate member in an etching liquid while controlling a lowering speed of a liquid surface of the etching liquid on the main faces of the base plate member to a desired lowering speed.

11 Claims, 21 Drawing Sheets

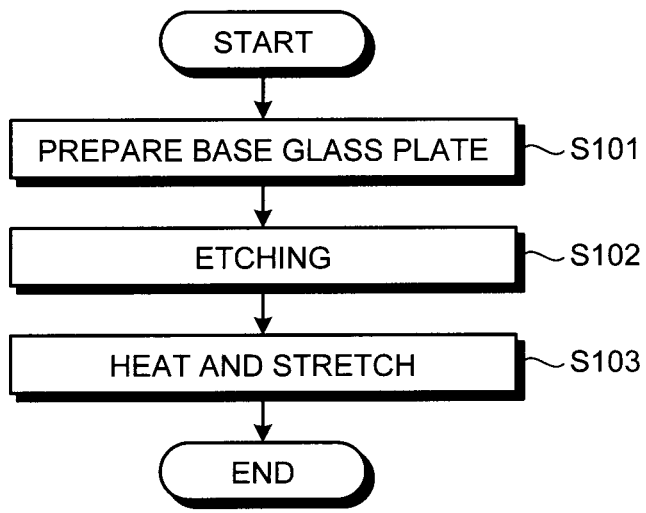
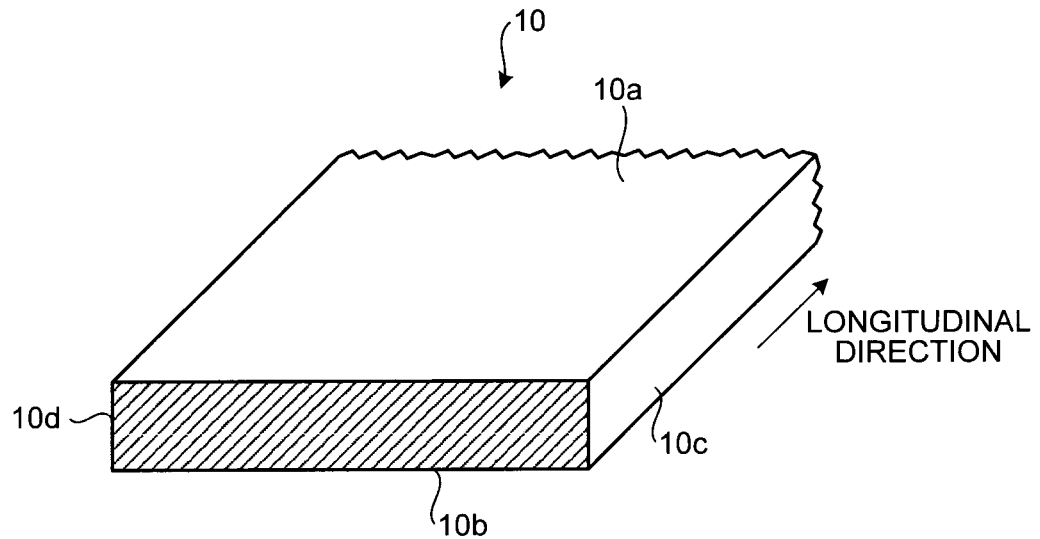

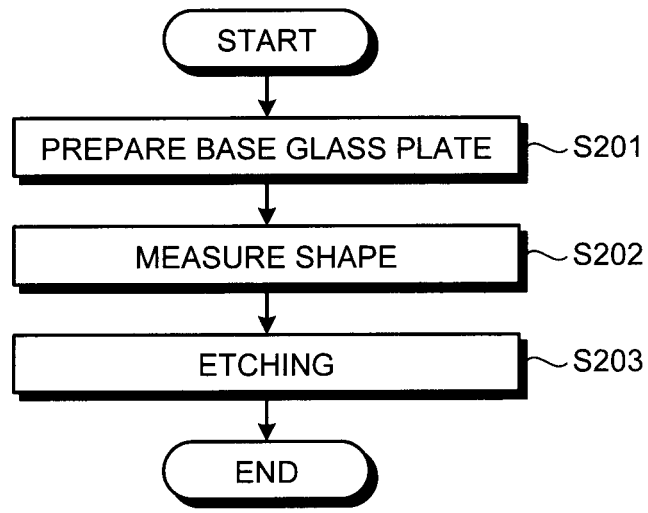
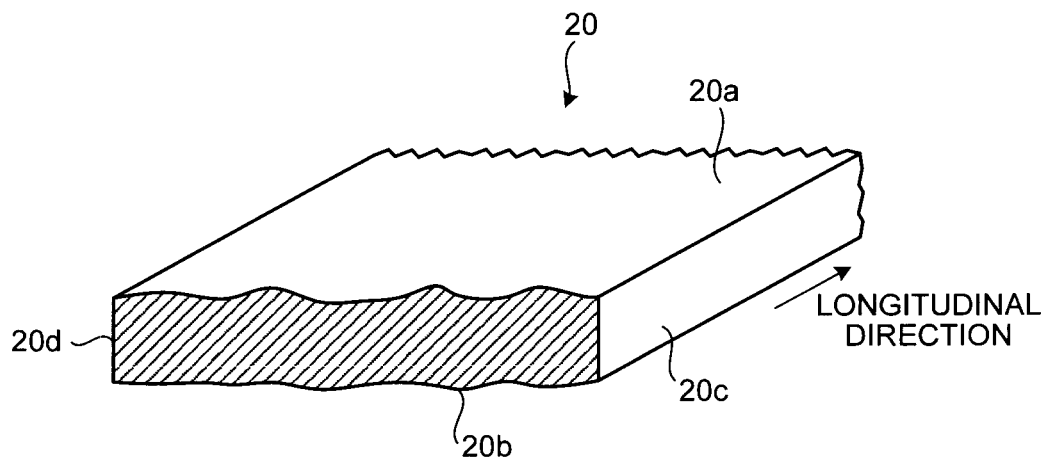

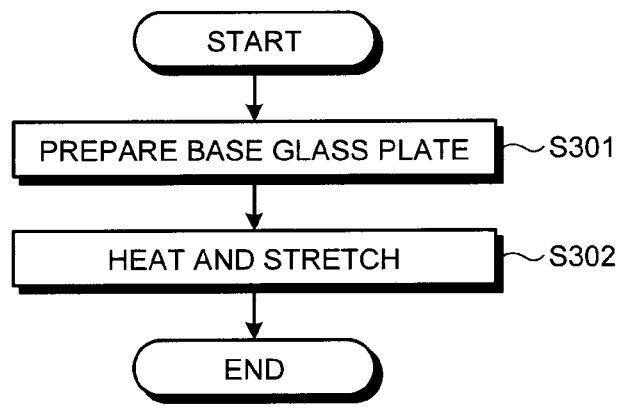
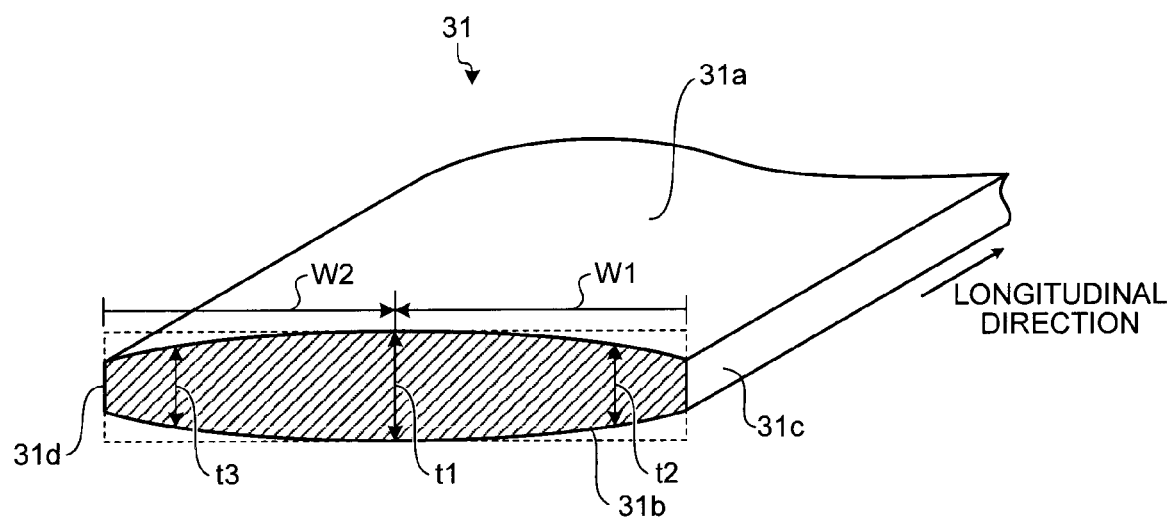

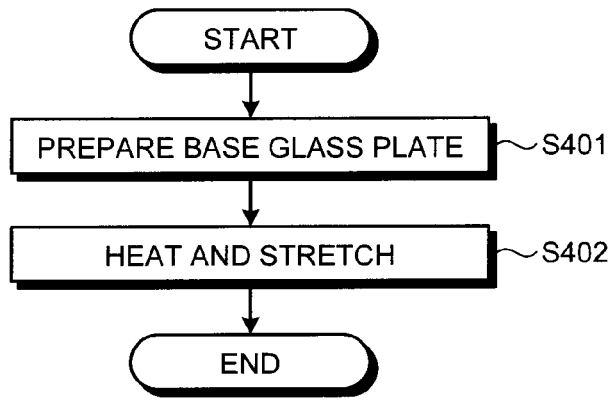
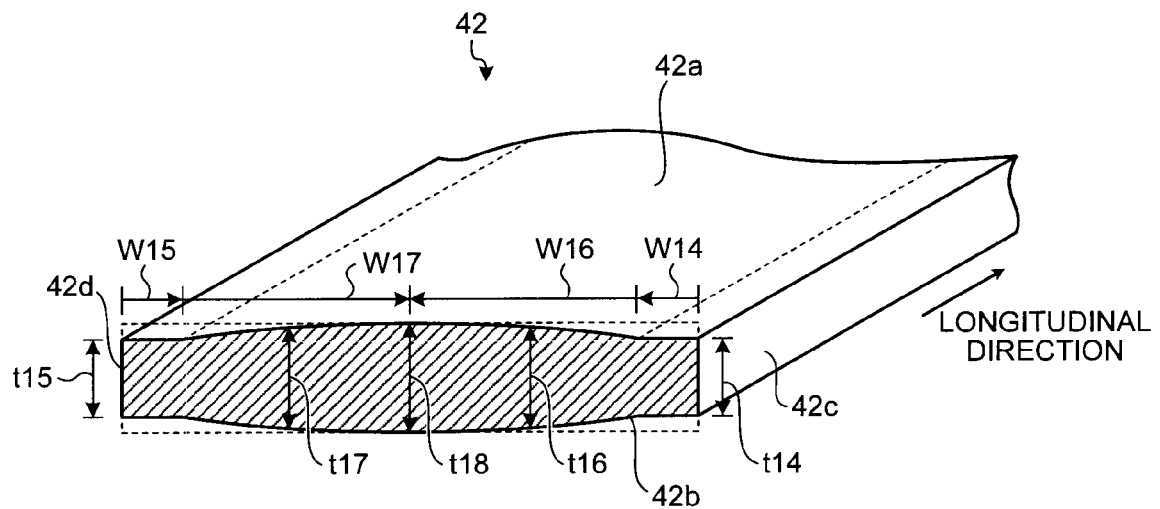

METHOD OF MANUFACTURING PLATE MEMBER AND PLATE MEMBER

CROSS-REFERENCE TO RELATED APPLICATIONS

This application is a continuation of PCT International Application No. PCT/JP2009/056349 filed on Mar. 27, 2009; the entire contents of which are incorporated herein by reference.

BACKGROUND OF THE INVENTION

1. Field of the Invention

The present invention relates to a method of manufacturing a plate member and a plate member.

2. Description of the Related Art

Conventionally, as a method of processing main faces of a plate member, a method in which a grinding device that grinds the main faces of the plate member in a planar shape by using a whetstone is used is disclosed (for example, see Japanese Patent Application Laid-Open (JP-A) No. 2002-86354).

Meanwhile, as a method of manufacturing a glass plate that is a plate member made of glass, a heating and stretching method in which a base glass plate having a predetermined thickness is heated so as to be softened and is stretched so as to have a desired thickness in the longitudinal direction is disclosed (for example, see JP-A No. 11-199255 and JP-A No. 2004-67393).

On the other hand, in order to cover the surface of a solar cell module, for a used glass plate, a texture process in which a concave-convex shape having a fine pitch is formed on the surface of the used glass plate is performed so as to decrease reflectivity of the surface, whereby the conversion efficiency of the solar cell module is improved (for example, see Takahashi Kiyoshi et al., "Photovoltaic Generation", Morikita Publication, 1979, p 153).

Here, as described in JP-A No. 2004-67393, in a glass plate manufactured by using the heating and stretching method, there is a case where the main face is curved in a concave shape so as to decrease the thickness in the center portion in the width direction and increase the thickness the most in the end portion. In order to use such a glass plate having a low flatness due to the curvature of the main faces for the purpose of requiring a high flatness such as a semiconductor device substrate, a spacer used in a flat panel display of the field-effect type, or a magnetic disk substrate, the main faces thereof need to be processed so as to increase the flatness thereof.

A glass plate manufactured by using a conventional heating and stretching method will be further described in detail. FIG. 39 is a perspective cross-sectional view of a glass plate manufactured by using the conventional heating and stretching method, cut in a face perpendicular to the longitudinal direction thereof. As shown in FIG. 39, this glass plate 51 has main faces 51a and 51b facing each other and facets 51c and 51d facing each other in the width direction. The facets 51c and 51d are approximately parallel to each other in the longitudinal direction. However, the main faces 51a and 51b are curved in a concave shape such that a thickness t31 in the center portion in the width direction is small, and a thickness t32 in the end portion is the largest. Accordingly, the flatness of the glass plate is low. Such a difference between the thickness of the center portion and the end portion is thought to be caused by different flow speeds of the glass material in the center portion and the end portion at the time of softening the base glass plate so as to be stretched.

Accordingly, conventionally, as shown in FIG. 40, a glass plate 52 having a high flatness of the main faces is manufactured having by cutting off both end portions 51e and 51f of the glass plate 51 and polishing the curved portions 51g to 51j of the main faces 51a and 51b. As a result, when the glass plate 52 is manufactured, a portion of the glass plate 51 to be wasted is increased. Accordingly, the manufacturing cost is increased, and the number of manufacturing processes such as a cutting process or a polishing is increased or the processing time is increased. Therefore, there is a problem in that the manufacturing cost is increased.

In contrast, a method of decreasing the curvature of the main surfaces by adjusting the temperature distribution inside a stretching heating furnace used in a stretching and heating process is disclosed (see JP-A No. 8-183627).

SUMMARY OF THE INVENTION

In accordance with one aspect of the present invention, a method of manufacturing a plate member comprises preparing a base plate member having main faces, and performing etching by immersing at least part of the base plate member in an etching liquid while controlling a lowering speed of a liquid surface of the etching liquid on the main faces of the base plate member to a desired lowering speed.

In accordance with another aspect of the present invention, a method of manufacturing a plate member comprises preparing a base glass plate having a curvature correcting area which extends in a longitudinal direction of the base glass plate and in which a thickness of the base glass plate between the main faces increases from each facet toward a center portion in a width direction, and softening the base glass plate by heating the base glass plate in a heating furnace to stretch the base glass plate so as to have a desired thickness.

In accordance with another aspect of the present invention, a method of manufacturing a plate member comprises preparing a base glass plate that has spacer portion forming areas formed to have a predetermined width starting from each facet in a width direction and curvature correcting areas formed to be adjacent to the spacer portion forming areas in a longitudinal direction in which, in each of the curvature forming areas, a thickness of the base glass plate between the main faces increases from each facet side toward a center portion in the width direction, and, in each of the spacer portion forming areas, the thickness of the base glass plate between the main faces is constant or increases from each facet toward the center portion more gently than that in the adjacent curvature forming area, and heating the base glass plate in heating furnace to soften and stretch the base glass plate so as to have a predetermined thickness.

In accordance with another aspect of the present invention, a plate member manufactured by using a manufacturing method that includes preparing a base glass plate having a curvature correcting area which extends in a longitudinal direction of the base glass plate and in which a thickness of the base glass plate between the main faces increases from each facet toward a center portion in a width direction, and softening the base glass plate by heating the base glass plate in a heating furnace to stretch the base glass plate so as to have a desired thickness, the plate member wherein a difference between a maximum value and a minimum value of the thickness between the main faces, over the width of the plate member is equal to or less than 50 μm.

In accordance with another aspect of the present invention, a plate member manufactured by using a manufacturing method that includes preparing a base glass plate having a curvature correcting area which extends in a longitudinal direction of the base glass plate and in which a thickness of the base glass plate between the main faces increases from each facet toward a center portion in a width direction, and softening the base glass plate by heating the base glass plate in a heating furnace to stretch the base glass plate so as to have a desired thickness, the plate member wherein a difference between a maximum value and a minimum value of the thickness between the main faces, over the width of the plate member is equal to or less than 10 µm.

In accordance with another aspect of the present invention, a plate member manufactured by using a manufacturing method that includes preparing a base glass plate having a curvature correcting area which extends in a longitudinal direction of the base glass plate and in which a thickness of the base glass plate between the main faces increases from each facet toward a center portion in a width direction, and softening the base glass plate by heating the base glass plate in a heating furnace to stretch the base glass plate so as to have a desired thickness, the plate member wherein a difference between a maximum value and a minimum value of the thickness between the main faces, over the width of the plate member is equal to or less than 1 µm.

In accordance with another aspect of the present invention, a plate member manufactured by using a manufacturing method that includes preparing a base glass plate that has spacer portion forming areas formed to have a predetermined width starting from each facet in a width direction and curvature correcting areas formed to be adjacent to the spacer portion forming areas in a longitudinal direction in which, in each of the curvature forming areas, a thickness of the base glass plate between the main faces increases from each facet side toward a center portion in the width direction, and, in each of the spacer portion forming areas, the thickness of the base glass plate between the main faces is constant or increases from each facet toward the center portion more gently than that in the adjacent curvature forming area, and heating the base glass plate in heating furnace to soften and stretch the base glass plate so as to have a predetermined thickness, the method comprises: spacer portions formed to have a predetermined width starting from each facet in the width direction; and a parallel portion formed between the spacer portions in which the main faces are parallel to each other, wherein a difference between a maximum value and a minimum value of the thickness between the main faces in the parallel portion is equal to or less than 10 µm.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a flowchart of a method of manufacturing a glass plate according to a first embodiment of the present invention;

FIG. 2 is a schematic perspective cross-sectional view of a base glass plate, which is prepared in a base glass plate preparing process, cut in a face perpendicular to a longitudinal direction thereof;

FIG. 11 is a flowchart of a method of manufacturing a glass plate according to a third embodiment;

FIG. 12 is a schematic perspective cross-sectional view of the base glass plate, which is prepared in this base glass plate preparing process, cut in a face perpendicular to the longitudinal direction thereof;

FIG. 19 is a flowchart of a method of manufacturing a glass plate according to a fourth embodiment;

FIG. 20 is a perspective cross-sectional view of the base glass plate, which is prepared in the base glass plate preparing process, cut in a face perpendicular to the longitudinal direction thereof;

FIG. 32 is a flowchart of a method of manufacturing a glass plate according to the seventh embodiment;

FIG. 33 is a perspective cross-sectional view of a base glass plate, which is prepared in the base glass plate preparing process, cut in a face perpendicular to the longitudinal direction thereof;

DETAILED DESCRIPTION OF THE PREFERRED EMBODIMENTS

Hereinafter, a method of manufacturing a plate member and a plate member according to embodiments of the present invention will be described with reference to drawings. However, the present invention is not limited to the embodiments.

First Embodiment

First, a method of manufacturing a plate member according to a first embodiment of the present invention will be described. In the first embodiment, a glass plate is used as the plate member.

FIG. 1 is a flowchart of a method of manufacturing a glass plate according to the first embodiment of the present invention. As shown in FIG. 1, in the method of manufacturing a glass plate according to the first embodiment, first, a base glass plate as a base plate member is prepared (Step S101). Next, the base glass plate prepared in Step S101 is etched (Step S102). Next, the base glass plate etched in Step S102 is heated and stretched (Step S103). Hereinafter, each process will be described in detail.

First, a base glass plate preparing process of Step S101 will be described. FIG. 2 is a schematic perspective cross-sectional view of the base glass plate, which is prepared in the base glass plate preparing process, cut in a face perpendicular to the longitudinal direction thereof. As shown in FIG. 2, this base glass plate 10 has main faces 10a and 10b facing each other and facets 10c and 10d facing each other in the width direction. The facets 10c and 10d are approximately parallel to each other along the longitudinal direction. The thickness of the base glass plate 10 is approximately constant along the width direction and the longitudinal direction.

The material of the base glass plate 10 is not particularly limited and is appropriately selected in accordance with the use of the glass plate to be manufactured. For example, quarts glass, aluminosilicate glass, soda lime glass, sodium aluminosilicate glass, aluminoborosilicate glass, borosilicate glass, or the like can be used.

In addition, the method of preparing the base glass plate 10 is not particularly limited. Thus, a known method such as a press method in which melted glass is molded by using a press die having a desired shape or a down-draw method in which melted glass is drawn out in the downward direction through a slit having a desired shape formed at the bottom portion of a furnace may be used. Alternatively, an up-draw method in which melted glass is drawn out in the upward direction through a slit having a desired shape formed in the top portion of a furnace may be used.

Figure 3:
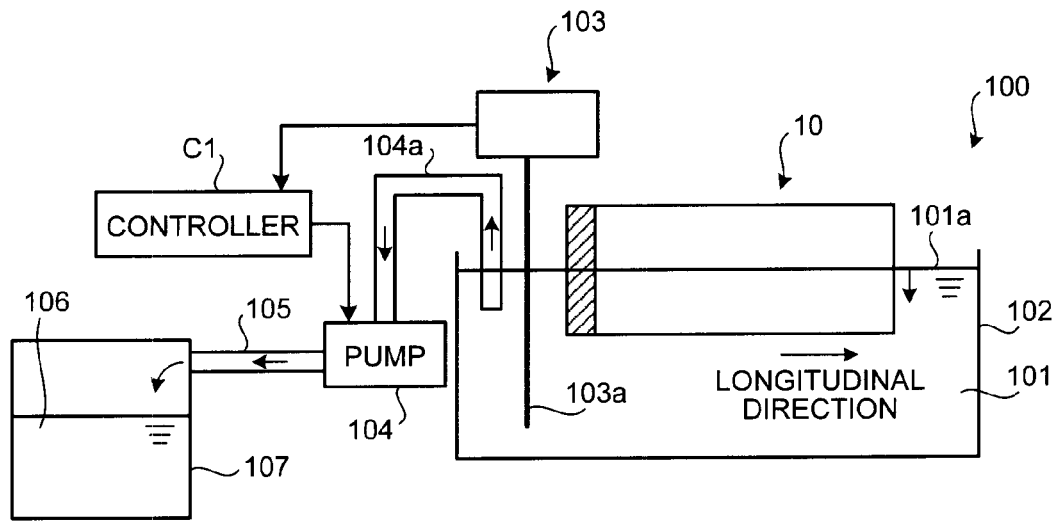
FIG. 3 is a schematic diagram of an example of an etching device used for performing an etching process.

Next, the etching process of Step S102 will be described. FIG. 3 is a schematic diagram of an example of an etching device used for performing the etching process. As shown in FIG. 3, the etching device 100 has a container 102, in which an etching liquid 101 such as a hydrofluoric acid solution that can etch glass is stored, and a sensor unit 103a. In addition, the etching device 100 has: a liquid surface sensor 103 that detects the position of the liquid surface 101a of the etching liquid 101; a pump 104 that pumps the etching liquid 101 from a transport pipe 104a; a transport pipe 105 that transports the etching liquid 101 pumped by the pump 104; a container 107 that stores the etching liquid 101 transported by the transport pipe 105 as an etching liquid 106; and a controller C1 that controls the pump 104 in accordance with position of the liquid surface 101a detected by the liquid surface sensor 103. Here, the liquid surface sensor 103 detects the liquid surface based on the value of the water pressure at the position of the lower end of the sensor unit 103a and a change therein.

Next, a method of performing an etching process using the etching device 100 will be described. First, the base glass plate 10 shown in FIG. 3 is immersed into the etching liquid 101 stored in the container 102. At this time, one side of the base glass plate 10 from the center thereof in the width direction is immersed into the etching liquid 101 while the longitudinal direction of the base glass plate 10 is maintained to be parallel to the liquid surface 101a of the etching liquid 101. Then, the base glass plate 10 is etched by the etching liquid 101.

Next, by pumping the etching liquid 101 and discharging the etching liquid into the container 107 through the transport pipe 105 by using the pump 104, the lowering speed of the liquid surface 101a of the etching liquid 101 is controlled such that the liquid surface 101a is lowered on the main faces 10a and 10b of the base glass plate 10 at a desired lowering speed. Accordingly, a portion of the base glass plate 10 that has been immersed in the etching liquid 101 is slowly exposed. As a result, the amount of etching of the base glass plate 10 increases in accordance with a time in which the base glass plate is immersed in the etching liquid 101. Accordingly, the thickness of the base glass plate 10 slowly decreases from the center thereof in the width direction toward the facet. Then, the base glass plate 10 comes to have a shape in which the bottom-side facet immersed in the etching liquid 101 for a longest time is the thinnest.

When the liquid surface 101a of the etching liquid 101 reaches below the bottom end of the base glass plate 10, the base glass plate 10 is moved to the upper side and is rotated by 180 degrees around the center in the width direction. Then, after the etching liquid 106 is back into the container 102, the base glass plate 10 is lowered, and the other side from the center in the width direction is immersed into the etching liquid 101. Therefore, as described above, by discharging the etching liquid 101 by using the pump 104, the lowering speed of the liquid surface 101a is controlled to be a desired lowering speed.

Here, the lowering speed of the liquid surface 101a of the etching liquid 101 is controlled as below. As described above, a glass plate manufactured by using the heating and stretching method may have a shape curved in a concave shape in which the center portion of the main face in the width direction is thin, and the end portion thereof is the thickest. Thus, according to the first embodiment, the lowering speed of the liquid surface 101a is controlled such that the curvature of the main face generated in the heating and stretching process of Step S103 is corrected.

Figure 4:
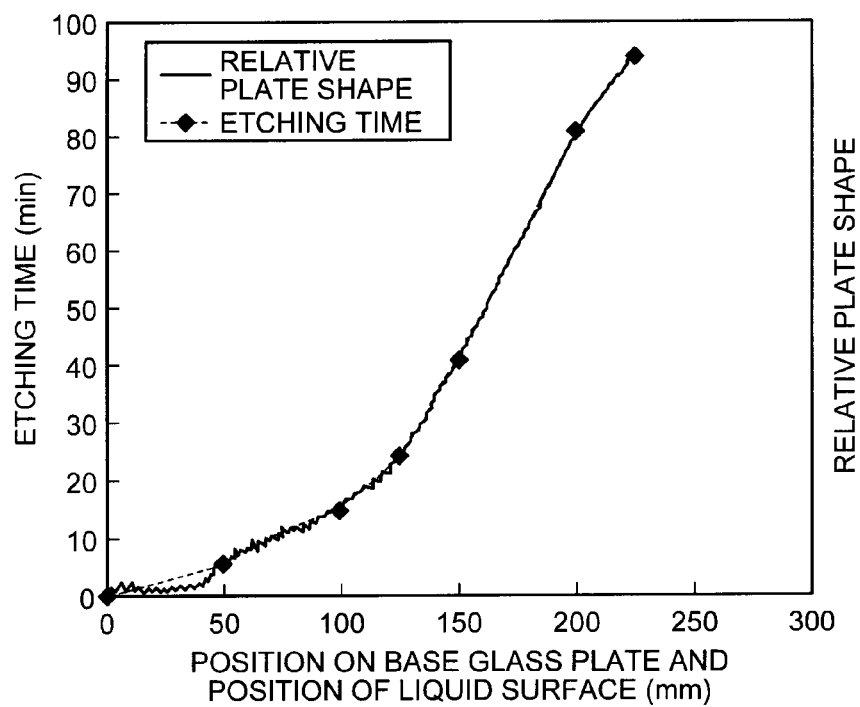
FIG. 4 is a diagram representing the relationship of a relative plate shape with respect to the position on the base glass plate and the relationship of an etching time with respect to a liquid surface position according to the first embodiment.

FIG. 4 is a diagram representing the relationship of the relative plate shape with respect to the position on the base glass plate and the relationship of the etching time with respect to the liquid surface position according to the first embodiment. FIG. 4 represents a case where a base glass plate formed from borosilicate glass having a width of 475 mm is etched by a hydrofluoric acid solution as an example. Here, the relative plate shape with respect to the position on the base glass plate represents the curvature of the main face of the glass plate generated in the heating and stretching process to be described later in association with the position on the base glass plate 10 before the heating and stretching process. In addition, the etching time with respect to the liquid surface position represents a time during which a portion of the main faces 10a and 10b of the base glass plate 10 that is at the position of the liquid surface 101a is etched. Here, the position on the base glass plate 10 and the liquid surface position are represented by distances from the center of the base glass plate 10 in the width direction, which is set as 0 mm, toward the lower side thereof.

In the first embodiment, as shown in FIG. 4, the lowering speed of the liquid surface 101a is controlled such that a curve representing the relative plate shape and a curve representing the etching time are in the same shape. Accordingly, the lowering speed of the liquid surface 101a can be controlled so as to correct the curvature of the main face generated in the heating and stretching process.

The control of the lowering speed of the liquid surface 101a is performed by adjusting the discharge speed of the pump 104 by using the controller C1 based on the position of the liquid surface 101a detected by the liquid surface sensor 103. Such an etching device 100 has a configuration that is simpler than that of a conventional grinding device using a whetstone and can perform the control of the lowering speed of the liquid surface 101a with high accuracy in an easy manner.

Figure 5:
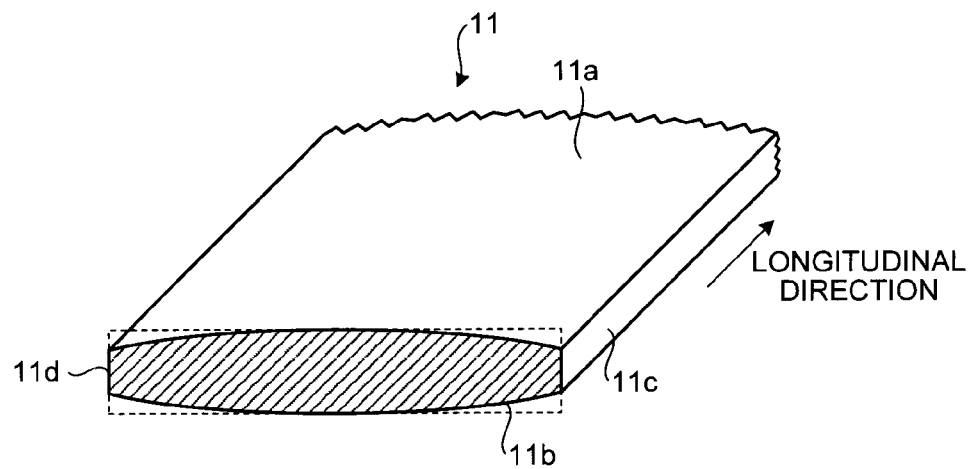
FIG. 5 is a schematic perspective cross-sectional view of the base glass plate, which has been etched by the control process shown in FIG. 4, cut in a face perpendicular to the longitudinal direction thereof.

FIG. 5 is a schematic perspective cross-sectional view of the base glass plate, which has been etched by the control process shown in FIG. 4, cut in a face perpendicular to the longitudinal direction thereof. As shown in FIG. 5, this base glass plate 11, similarly to the base glass plate 10, has main faces 11a and 11b facing each other and facets 11c and 11d facing each other in the width direction. However, the main faces 11a and 11b are curved in a convex shape in which the thickness decreases from the center thereof in the width direction toward the facet 11c or 11d. The curved shape of the main faces 11a and 11b is an approximately reversed shape of the relative plate shape shown in FIG. 4.

Figure 6:
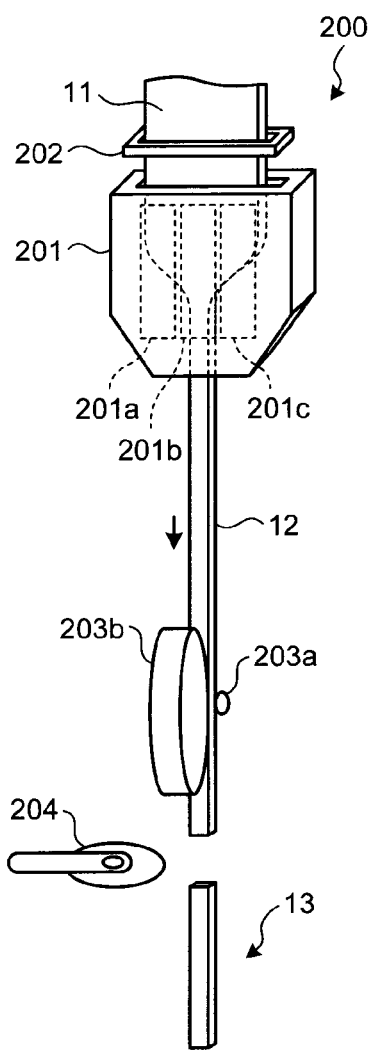
FIG. 6 is a schematic diagram of an example of a heating and stretching device used in this heating and stretching process.

Next, the heating and stretching process of Step S103 will be described. FIG. 6 is a schematic diagram of an example of a heating and stretching device used in this heating and stretching process. As shown in FIG. 6, this heating and stretching device 200 includes: a heating furnace 201; a base feed mechanism 202; pickup mechanisms 203a and 203b; and a cutter 204.

The heating furnace 201 is an electric resistance furnace used for heating and stretching the base glass plate 11 and includes a plurality of heaters 201a to 201c disposed so as to face one main face of the base glass plate 11 as a heating means. In addition, the heating furnace 201 also includes a plurality of heaters disposed so as to face the other main face of the base glass plate 11. The base feed mechanism 202 is disposed on the upper side of the heating furnace 201 and feeds the base glass plate 11 in the longitudinal direction to the inside of the heating furnace 201 from the upper side of the heating furnace 201. In addition, the pickup mechanisms 203a and 203b are disposed on the lower side of the heating furnace 201 and pick up a glass plate 12 formed by heating and stretching the base glass plate 11. The cutter 204 is disposed on the back of the pickup mechanisms 203a and 203b and forms a groove on the surface of the glass plate 12 so as to be cleaved to have a predetermined length. The heating furnace 201, the base feed mechanism 202, and the pickup mechanisms 203a and 203b are connected to the controller. This controller controls the temperature of the inside of the heating furnace 201, the base feed speed of the base feed mechanism 202, the pickup speed of the pickup mechanisms 203a and 203b, and the like based on a measured value of the outer diameter of the glass plate 12 measured by an outer diameter measuring unit.

Next, the method of heating and stretching the base glass plate 11 by using the heating and stretching device 200 will be described. First, by allowing each heater of the heating furnace 201 to be electrically conducted, the temperature of the inside of the furnace is adjusted to predetermined temperature equal to or higher than the softening temperature of the base glass plate 11. At this time, in order to increase the flatness, a temperature distribution may be formed in the width direction and the longitudinal direction of the base. Generally, it is preferable that the width direction is formed so as to increase the temperature of the end portion, and the longitudinal direction is formed so as to decrease the temperature gradient. Next, the base feed mechanism 202 feeds the base glass plate 11 to the inside of the heating furnace 201 with the longitudinal direction thereof facing the lower side. When the base glass plate 11 fed to the heating furnace 201 is heated to be at temperature equal to or higher than the softening temperature, the width thereof is contracted so as to be stretched to have a desired thickness.

Here, the main faces 11a and 11b of the base glass plate 11 are curved in a convex shape. Accordingly, the curved shape curved in the concave shape that has been originally generated at the time of the conventional heating and stretching process is corrected. Thus, a formed glass plate 12 has the main faces of which flatness is high.

Thereafter, the formed glass plate 12 is picked up by the pickup mechanisms 203a and 203b, and the cutter 204 forms a groove on the surface of the glass plate 12 so as to be cleaved to have a predetermined length, whereby a glass plate 13 having a predetermined length is formed.

Figure 7:
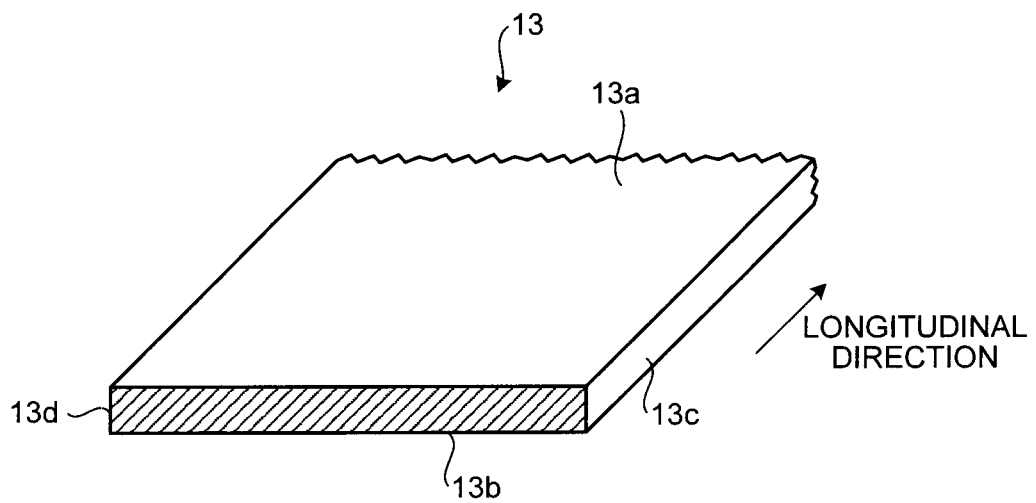
FIG. 7 is a schematic perspective cross-sectional view of the cleaved glass plate cut in a face perpendicular to the longitudinal direction thereof.

FIG. 7 is a schematic perspective cross-sectional view of the cleaved glass plate 13 cut in a face perpendicular to the longitudinal direction thereof. As shown in FIG. 7, this glass plate 13 has main faces 13a and 13b facing each other and facets 13c and 13d facing each other in the width direction. The facets 13c and 13d are approximately parallel to each other along the longitudinal direction. In addition, the thickness of the glass plate 13 is approximately constant along the width direction and the longitudinal direction, and accordingly, the flatness of the main faces 13a and 13b is high.

As described above, according to the first embodiment, the surface shape of the main faces of the glass plate can be formed in the shape having high flatness in an easy manner.

When a difference between a maximum value and a minimum value of the thickness of the glass plate 13 between the main faces 13a and 13b in the width direction is equal to or less than 50 μm, the glass plate 13 can be used for the purpose of a protective glass substrate such as cover glass for the entire area in the width direction including the facets 13c and 13d. Particularly, since the main faces 13a and 13b and the facets 13c and 13d are faces that have been melted, the surface roughness thereof is extremely excellent. Accordingly, the glass plate 13 becomes a glass plate that is surrounded by surfaces having extremely excellent surface roughness without additionally performing fine polishing for the main faces 13a and 13b or edge polishing for the facets 13c and 13d out of four facets or only with performing fine polishing for an extremely short time.

When a difference between a maximum value and a minimum value of the thickness of the glass plate 13 between the main faces 13a and 13b in the width direction is equal to or less than 10 μm, the glass plate 13 can be used for the purpose of an HDD substrate by forming a hole in a circular ring shape therein. Particularly, since the main faces 13a and 13b are faces that have been melted, the surface roughness thereof is extremely excellent, and the accuracy of the plate thickness is high. Accordingly, the glass plate 13 becomes a glass plate having extremely excellent surface roughness without additionally performing fine polishing for the surfaces or only with performing fine polishing for an extremely short time.

When a difference between a maximum value and a minimum value of the thickness of the glass plate 13 between the main faces 13a and 13b in the width direction is equal to or less than 1 μm, the glass plate 13 can be used as a glass substrate, which has flexibility over the entire area including the facets 13c and 13d in the width direction, for electronic devices. Particularly, since the main faces 13a and 13b and the facets 13c and 13d are faces that have been melted, the surface roughness thereof is extremely excellent. Accordingly, the glass plate 13 becomes a glass plate that is surrounded by surfaces having extremely excellent surface roughness without additionally performing fine polishing or edge polishing for the surfaces or only with performing fine polishing for an extremely short time, whereby a device having flexibility or the like can be manufactured. In addition, since the accuracy of the shape of the base is acquired simultaneously with stretching the substrate, a functional thin film such as an Si film or a transparent conductive film can be formed online on the glass substrate simultaneously with stretching the substrate, without performing polishing or the like for the substrate.

The curved shape curved in a concave shape, which is generated when a conventional base glass plate is heated and stretched, changes in accordance with a temperature distribution inside the heating furnace, the stretching speed, the pulling down rate, the viscosity of the base glass plate, or the aspect ratio of the base glass plate. Here, the stretching speed is a difference between the pickup speed for the stretched glass plate and the transport speed of the base glass plate, and the pulling down rate is a ratio of the width of the stretched glass plate to the width of the base glass plate. In addition, the aspect ratio is a ratio of the width to the thickness of the base glass plate.

When the aspect ratio is increased, a ratio of a difference between the thickness of the center portion and the end portion to the thickness of the center portion of the stretched glass plate increases and becomes marked as the viscosity is decreased. Even when the pulling down rate is increased, the ratio of the difference between the thickness of the center portion and the thickness of the end portion to the thickness of the center portion of the glass plate increases. Accordingly, it is preferable that the shapes of the main faces 11a and 11b of the base glass plate 11 formed by etching are determined based on at least one of the above-described factors. For example, when the pulling down rate is high, the main faces 11a and 11b are formed in a shape curved in a more convex shape. In addition, for example, the shapes of the main faces 11a and 11b may be formed to be different from each other in accordance with the symmetry of the temperature distribution inside the heating furnace, and the shape of the main face 11a may be formed to be different on both sides of the center in the width direction. As described above, it is preferable that the shapes of the main faces 11a and 11b are determined so as to offset the shape curved in a concave shape as much as possible, which is generated when the heating and stretching process is performed.

In addition, the shapes of the main faces 11a and 11b of the base glass plate 11 may be determined based on the shapes of formed test glass plates by preparing test base glass plates having different curved shapes of the main faces and forming test glass plates by heating and stretching the test base glass plates as a test.

Second Embodiment

Next, a second embodiment of the present invention will be described. The second embodiment relates to a method of manufacturing a glass plate. In the second embodiment, in addition to controlling the lowering speed of the liquid surface of the etching liquid so as to correct the curvature of the main face generated in the heating and stretching process, similarly to the first embodiment, control of changing the lowering speed of the liquid surface so as to form a concave-convex shape stretching along a predetermined direction on the main face is performed.

The method of manufacturing the glass plate according to the second embodiment will now be described. First, by using a method similar to that of the first embodiment, a base glass plate 10 as shown in FIG. 2 is prepared. Next, by using an etching device 100 as shown in FIG. 3, the prepared base glass plate 10 is etched by controlling the lowering speed of the liquid surface 101a of the etching liquid 101.

Figure 8:
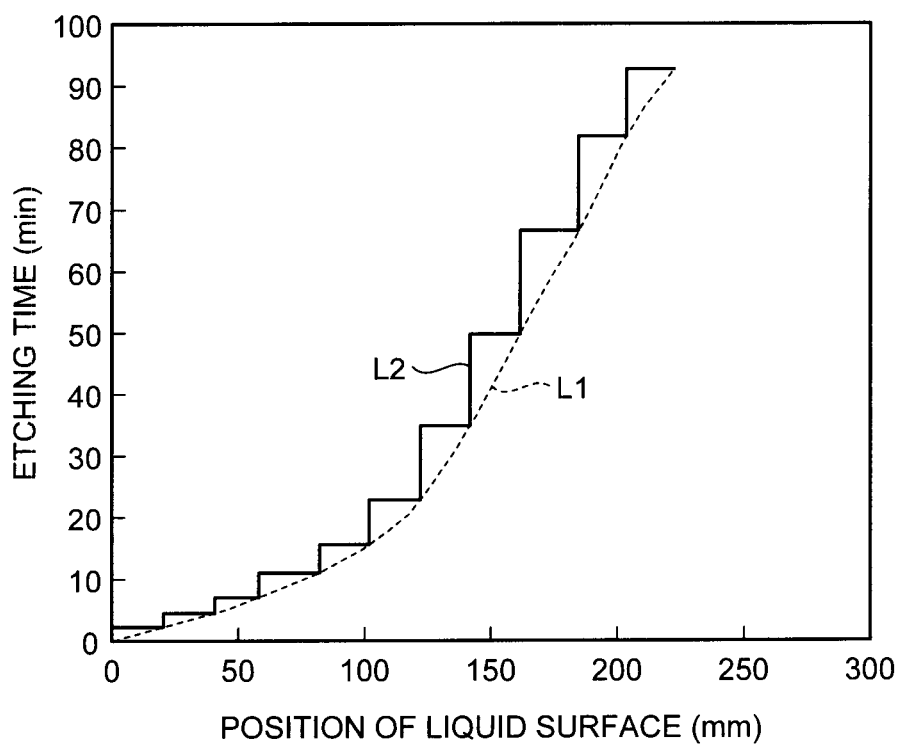
FIG. 8 is a diagram representing the relationship of the etching time with respect to the position of the liquid surface according to a second embodiment.

FIG. 8 is a diagram representing the relationship of the etching time with respect to the position of the liquid surface according to the second embodiment. In FIG. 8, a line L1 is the same curve as the line representing the etching time in FIG. 4, and a line L2 is a line that represents the etching time according to the second embodiment. As shown in FIG. 8, according to this embodiment, the lowering speed of the liquid surface is controlled so as to vary along the line L1 to be higher or lower than the line L1 representing the control process for correcting the curvature of the main faces generated in the heating and stretching process.

Figure 9:
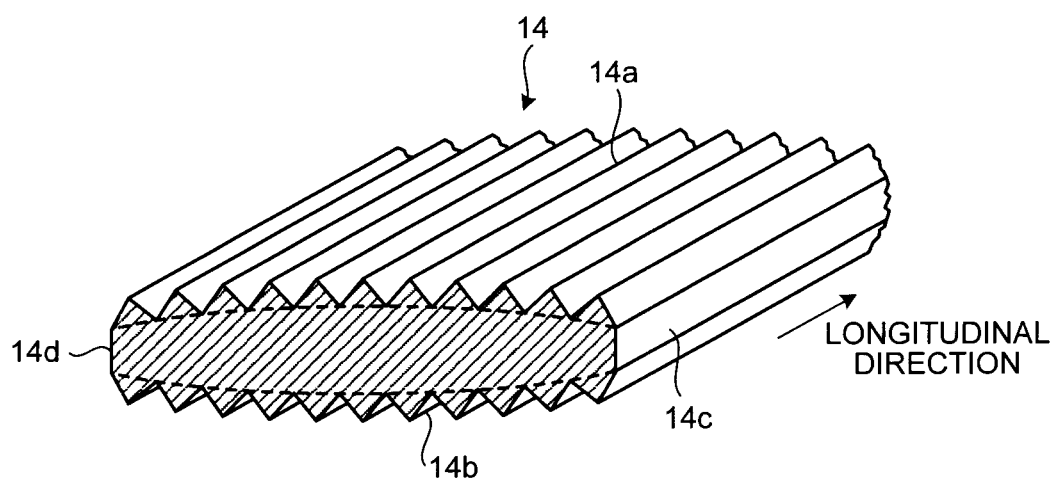
FIG. 9 is a schematic perspective cross-sectional view of the base glass plate, which has been etched by the control process shown in FIG. 8, cut in a face perpendicular to the longitudinal direction thereof.

FIG. 9 is a schematic perspective cross-sectional view of the base glass plate, which has been etched by the control process shown in FIG. 8, cut in a face perpendicular to the longitudinal direction thereof. As shown in FIG. 9, this base glass plate 14 has main faces 14a and 14b facing each other and facets 14c and 14d facing each other in the width direction. However, on the main faces 14a and 14b, a concave-convex shape stretched along the longitudinal direction is formed. As shown in FIG. 8, since the line L2 is controlled to follow the line L1, faces that connect concave portions of the main faces 14a and 14b, similarly to the main faces 11a and 11b of the base glass plate 11 shown in FIG. 5, are curved in a convex shape, so that the thickness of the base glass plate decreases from the center in the width direction toward the facets 14c and 14d.

Next, by using a method that is similar to that of the first embodiment, by using a heating and stretching device 200 as shown in FIG. 6, the base glass plate 14 that has been etched is heated and stretched so as to be formed as a glass plate, and then, a cleaving process is performed for the glass plate.

Figure 10:
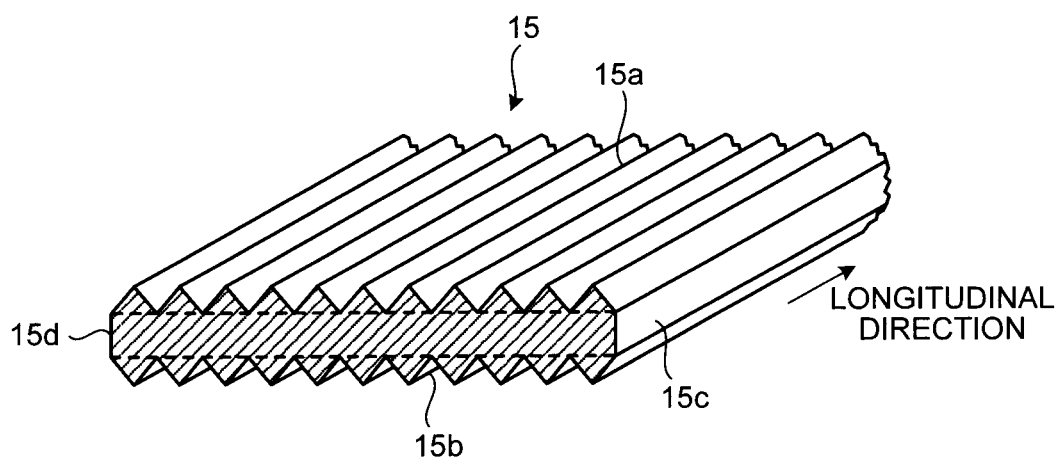
FIG. 10 is a schematic perspective cross-sectional view of the cleaved glass plate cut in a face perpendicular to the longitudinal direction thereof.

FIG. 10 is a schematic perspective cross-sectional view of the cleaved glass plate 15 cut in a face perpendicular to the longitudinal direction thereof. As shown in FIG. 10, this glass plate 15 has main faces 15a and 15b facing each other and facets 15c and 15d facing each other in the width direction. On the main faces 15a and 15b of this glass plate 15, a concave-convex shape stretched in the longitudinal direction is formed on the main faces 15a and 15b of this glass plate 15. The facets 15c and 15d are approximately parallel to each other along the longitudinal direction. In addition, faces that connect concave portions of the main faces 15a and 15b are approximately parallel to each other.

It is extremely difficult to perform such a process of forming the concave-convex shapes on the main faces by using a conventional grinding method using a whetstone. However, according to the second embodiment, such a process can be performed in an easy manner by controlling the lowering speed of the liquid surface of the etching liquid. In addition, the pitch of the concave-convex shape can be easily adjusted by controlling the lowering speed of the liquid surface, and for example, the pitch can be adjusted in the range of 0.01 nm to 10 nm. Accordingly, such a method is appropriate also for forming a texture shape on the surface of the glass plate used for a solar cell. In addition, the concave and convex shape to be formed is not limited to a shape having a regular period, and a concave-convex shape having an irregular period can be formed.

Third Embodiment

Next, a third embodiment of the present invention will be described. The third embodiment relates to a method of manufacturing a glass plate. According to the third embodiment, the surface shape of the base glass plate is measured, and the lowering speed of the liquid surface of the etching liquid is controlled based on the measured surface shape.

FIG. 11 is a flowchart of a method of manufacturing a glass plate according to the third embodiment. As shown in FIG. 11, in the method of manufacturing a glass plate according to the third embodiment, first, a base glass plate is prepared (Step S201). Next, the surface shape of the base glass plate prepared in Step S201 is measured (Step S202). Next, the base glass plate of which the surface shape is measured is etched (Step S203). Hereinafter, each process will be described in detail.

First, in a base glass plate preparing process of Step S201, similarly to the first embodiment, a base glass plate is prepared by using a down-draw method or an up-draw method. There are cases where a fine concave-convex shape is formed along the longitudinal direction, which is a drawn-out direction, on the main face of the base glass plate prepared by using such a method.

FIG. 12 is a schematic perspective cross-sectional view of the base glass plate, which is prepared in this base glass plate preparing process, cut in a face perpendicular to the longitudinal direction thereof. As shown in FIG. 12, this base glass plate 20 has main faces 20a and 20b facing each other and facets 20c and 20d facing each other in the width direction. The facets 20c and 20d are approximately parallel to each other along the longitudinal direction. On the other hand, fine concave-convex shapes are formed on the main faces 20a and 20b along the longitudinal direction of the main faces. In FIG. 12, the concave-convex shapes of the main faces 20a and 20b are represented with the scale thereof in the height direction being enlarged. Actually, the height of the concave-convex shapes is about 1 µm.

Next, in the surface shape measuring process of Step S202, by using a known surface shape measuring device such as CS-5000 manufactured by Mitutoyo Corporation, the shapes of the main faces 20a and 20b of the base glass plate 20 are measured in the width direction.

Figure 13:
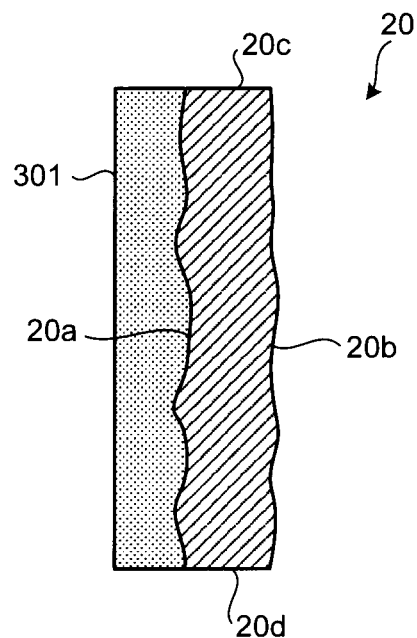
FIG. 13 is a schematic diagram representing a state of the base glass plate to be etched seen in the longitudinal direction thereof.

Next, the etching process of Step S203 will be described. This etching process includes a first etching process and a second etching process. FIG. 13 is a schematic diagram representing a state of the base glass plate 20 to be etched seen in the longitudinal direction thereof. First, as shown in FIG. 13, a protective member 301 is attached so as to cover the entire face of the main face 20a of the base glass plate 20. On the other hand, the main face 20b is maintained to be exposed. The attachment of the protective member 301 is performed by bonding, for example, by using an adhesive agent or the like so as to generate no gap between the main face 20a and the protective member. The adhesive agent and the protective member 301 formed from materials such as rubber that are not eroded by the etching liquid used in the etching process are used.

Next, as the first etching process, similarly to the first and second embodiments, by using the etching device 100 as shown in FIG. 3, the prepared base glass plate 20 is etched by controlling the lowering speed of the liquid surface 101a of the etching liquid 101. In the first etching process, differently from the first and second embodiments, the entire base glass plate is immersed into the etching liquid 101 in the state in which the facet 20c of the base glass plate 20 is disposed so as to face the upper side, and the etching process is started in the state in which the facet 20c coincides with the liquid surface 101a of the etching liquid 101.

Figure 14:
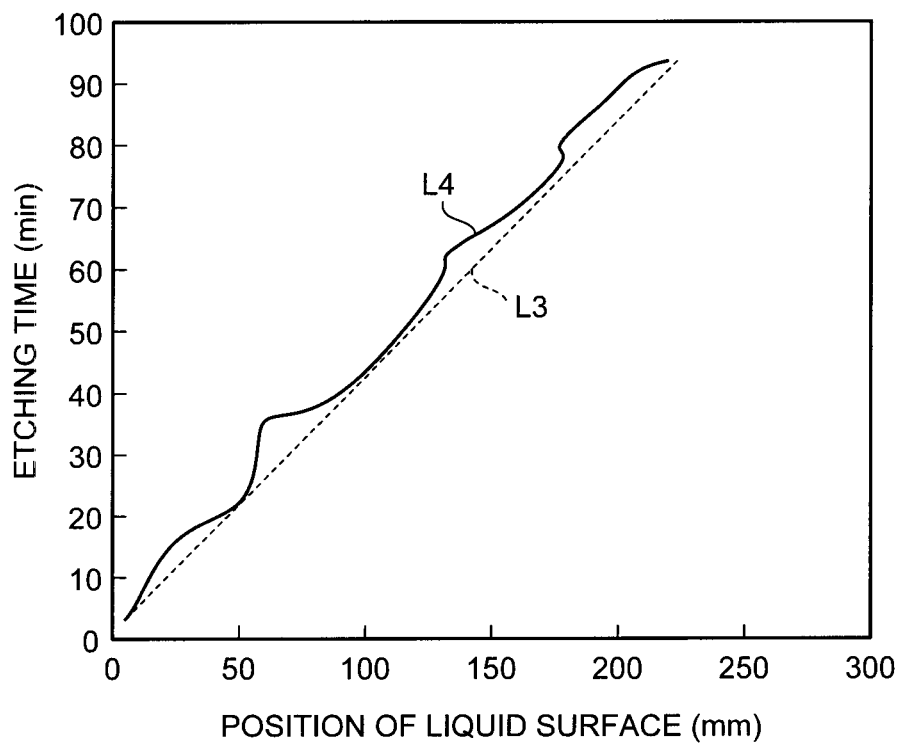
FIG. 14 is a diagram representing the relationship of an etching time with respect to the position of the liquid surface in the first etching process.

Here, FIG. 14 is a diagram representing the relationship of the etching time with respect to the position of the liquid surface in the first etching process. In FIG. 14, a line L3 represents a straight line that becomes a reference when the lowering speed is controlled, and a line L4 is a line that represents the etching time according to the third embodiment. As shown in FIG. 14, in this first etching process, the lowering speed of the liquid surface is controlled so as to vary along the line L4 to be higher or lower than the line L4 acquired by adding the concave-convex shape of the main face 20b measured in Step S202 to the reference line L3.

Figure 15:
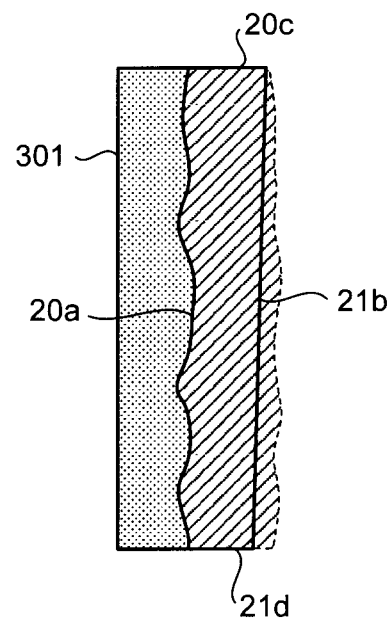
FIG. 15 is a schematic diagram representing the state of the base glass plate after the first etching process, seen in the longitudinal direction thereof.

FIG. 15 is a schematic diagram representing the state of the base glass plate after the first etching process, seen in the longitudinal direction thereof. As shown in FIG. 15, since being protected by the protective member 301, the main face 20a is not etched. However, the main face 20b that is not protected is etched, and the surface shape thereof is changed like the main face 21b. As described above, by controlling the lowering speed of the liquid surface along the line L4 having the shape acquired by adding the concave-convex shape of the main face 20b to the line L3 having a linear shape that becomes the reference, the main face 21b faces the lower side on the plane of paper and is formed in a flat shape tilted so as to decrease the distance to the main face 20a. In addition, the facet 20d becomes a facet 21d of which the width is decreased by the etching.

Figure 16:
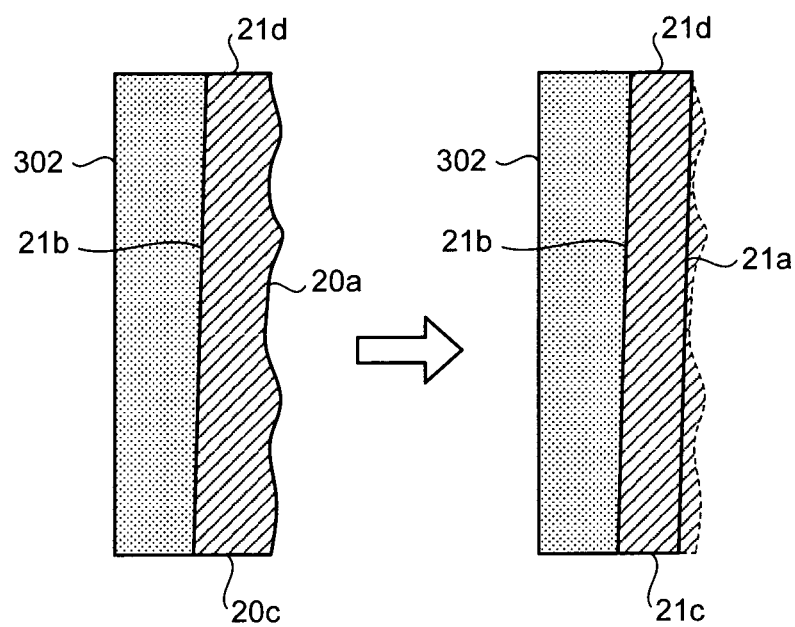
FIG. 16 is an explanatory diagram illustrating a second etching process.

FIG. 16 is an explanatory diagram illustrating the second etching process. First, as shown in a diagram shown on the left side of FIG. 16, the base glass plate is rotated around the center in the width direction by 180 degrees so as to make the facet 21d to face the upper side, and a protective member 302 that is the same as the protective member 301 is attached so as to cover the entire face of the main face 21b. Next, as the second etching process, by using the etching device 100, the base glass plate is etched by controlling the lowering speed of the liquid surface 101a of the etching liquid 101. In addition, in the second etching process, the entire base glass plate is immersed into the etching liquid 101 in the state in which the facet 21d of the base glass plate faces the upper side, and the etching process is started in the state in which the facet 21d coincides with the liquid surface 101a of the etching liquid 101.

In the second etching process, the lowering speed of the liquid surface is controlled so as to vary along a line acquired by adding the shape of the concave-convex shape of the main faces 20a measured in Step S202 to the reference line L3 shown in FIG. 14 to be higher or lower than the line. As a result, as shown in the diagram shown on the right side of FIG. 16, the main face 20a is etched, and the surface shape thereof is changes like the main face 21a. As described above, by controlling the lowering speed of the liquid surface so as to vary along the line acquired by adding the concave-convex shape of the main face 20a to the line L3 having a linear shape that becomes a reference, the main face 21a becomes a flat shape parallel to the main face 21b. In addition, the facet 20c becomes a facet 21c having the same width as that of the facet 21d by being etched.

Figure 17:
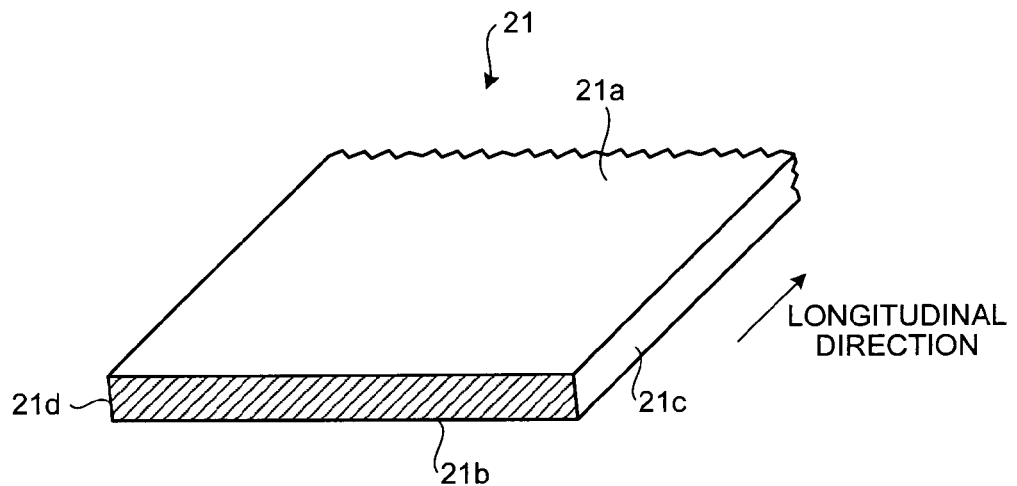
FIG. 17 is a schematic perspective cross-sectional view of the glass plate after completion of the etching process, cut in a face perpendicular to the longitudinal direction thereof.

FIG. 17 is a schematic perspective cross-sectional view of the glass plate after completion of the etching process of Step S203, cut in a face perpendicular to the longitudinal direction thereof. As shown in FIG. 17, this glass plate 21 has main faces 21a and 21b facing each other and facets 21c and 21d facing each other in the width direction. The main face 21a, the main face 21b, the facet 21c, and the facet 21d are approximately parallel to each other in the longitudinal directions thereof, and each facet of the glass plate 21 becomes a parallelogram. The concave-convex shapes formed on the main faces 20a and 20b of the base glass plate 20 are eliminated by being etched. Thus, the main faces 21a and 21b are formed to be extremely flat. Accordingly, according to the third embodiment, a glass plate having a high flatness of the main faces can be manufactured in a simpler manner by using an inexpensive base glass plate that has the main faces on which concave-convex shapes are formed.

In the above-described third embodiment, the glass plate is used as a plate member. However, the present invention is not limited thereto. Thus, the present invention can be applied to a plate member formed from a semiconductor, a metal material, or the like by appropriately selecting the etching liquid.

In addition, the above-described embodiments may be appropriately combined. For example, when the second and third embodiments are combined, a glass plate on which a desired concave-convex shape is formed can be manufactured while eliminating an unnecessary concave-convex shape existing on the main faces of the base glass plate.

Figure 18:
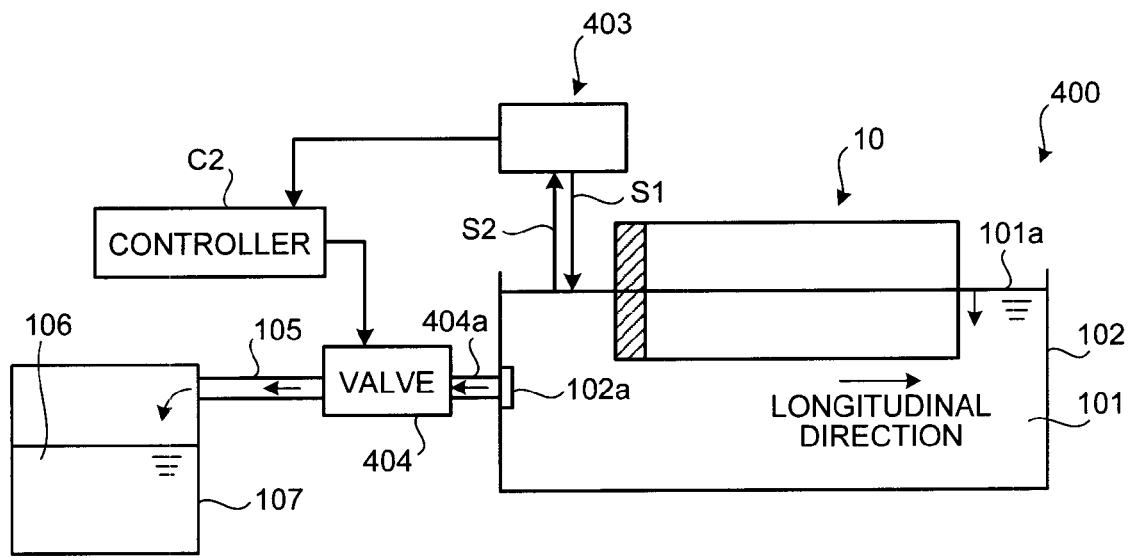
FIG. 18 is a schematic diagram of another example of an etching device that can be used in each of the above-described embodiments.

In the above-described embodiments, the etching device 100 shown in FIG. 3 is described to be used. However, the etching device is not particularly limited. FIG. 18 is a schematic diagram of another example of an etching device that can be used in each of the above-described embodiments. As shown in FIG. 18, this etching device 400 has a configuration in which the liquid surface sensor 103, the transport pipe 104a, and the pump 104 of the etching device 100 are replaced by a liquid surface sensor 403, a transport pipe 404a, and a valve 404.

The liquid surface sensor 403 is an ultrasonic liquid surface system. The liquid surface sensor 403 transmits an ultrasonic wave S1 toward the liquid surface 101a of the etching liquid 101, receives an ultrasonic wave S2 reflected by the liquid surface 101a, and detects the position of the liquid surface 101a based on a time difference between the transmission and the reception. The transport pipe 404a transports the etching liquid 101 discharged from a discharge hole 102a formed in a container 102 to the valve 404. The valve 404, for example, is an air valve formed from Teflon (registered trademark). The open/closed amount of the valve is controlled by a controller C2 in accordance with the position of the liquid surface 101a detected by the liquid surface sensor 403, and accordingly, the valve 404 adjusts the discharge amount of the etching liquid 101 for the transport pipe 105. Accordingly, processing is controlled at a desired lowering speed of the liquid surface 101a of the etching liquid 101.

Fourth Embodiment

Next, a method of manufacturing a glass plate according to a fourth embodiment of the present invention will be described. According to the method of manufacturing a glass plate according to the fourth embodiment, a base glass plate having a curvature correcting area used for correcting the curvature of the main faces generated by using the heating and stretching method is prepared.

FIG. 19 is a flowchart of a method of manufacturing a glass plate according to the fourth embodiment of the present invention. As shown in FIG. 19, in the method of manufacturing a glass plate according to the fourth embodiment, first, a base glass plate is prepared (Step S301). Next, the base glass plate prepared in Step S301 is heated and stretched (Step S302). Hereinafter, each process will be described in detail.

First, a base glass plate preparing process of Step S301 will be described. FIG. 20 is a perspective cross-sectional view of the base glass plate, which is prepared in the base glass plate preparing process, cut in a face perpendicular to the longitudinal direction thereof. As shown in FIG. 20, this base glass plate 31 has main faces 31a and 31b facing each other and facets 31c and 31d facing each other in the width direction. The facets 31c and 31d are approximately parallel to each other along the longitudinal direction. The thickness of the base glass plate 31 between the main faces 31a and 31b is a thickness t1 in the center portion thereof in the width direction. In addition, this base glass plate 31 has a curvature correcting area W1, in which a thickness t2 between the main faces 31a and 31b increases from the facet 31c toward the center portion in the width direction, along the longitudinal direction. Similarly, this base glass plate 31 has a curvature correcting area W2, in which a thickness t3 between the main faces 31a and 31b increases from the facet 31d toward the center portion in the width direction, along the longitudinal direction. In this base glass plate 31, both the curvature correcting areas W1 and W2 extend up to the center portion of the base glass plate 31 in the width direction.

The material of the base glass plate 31 is not particularly limited and is appropriately selected in accordance with the use of the glass plate to be manufactured. For example, the same material as that of the base glass plate 10 according to the first embodiment can be used.

In addition, the method of preparing the base glass plate 31 having such curvature correcting areas W1 and W2 is not particularly limited. Thus, for example, in the base glass plate 31 manufactured by using a known method such as a press method, a down-draw method, or an up-draw method, which is the same for the case of the base glass plate 10 of the first embodiment, the curvature correcting areas W1 and W2 may be formed by using mechanical processing using a whetstone, a wet etching method, or the like.

Figure 21:
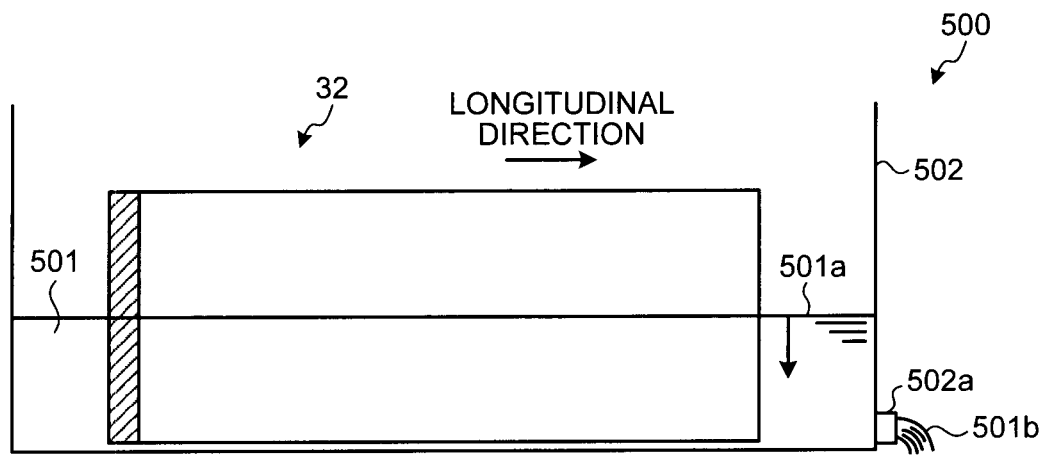
FIG. 21 is an explanatory diagram illustrating an example of the method of preparing the base glass plate shown in FIG. 20.

Hereinafter, as an example, the method of forming the curvature correcting areas by using the wet etching method will be described. FIG. 21 is an explanatory diagram illustrating an example of the method of preparing the base glass plate 31 shown in FIG. 20. The method represented in FIG. 21 is a method using etching (hereinafter, referred to as an etching method). As shown in FIG. 21, a raw base glass plate 32, which has main faces parallel to each other, formed, for example, by using a known float method or the like is prepared. Then, the raw base glass plate 32 is immersed into an etching liquid 501 such as a hydrofluoric acid solution stored in a container 502 of an etching device 500. At this time, an area of the raw base glass plate 32 that has a predetermined width from one facet thereof in the width direction, in particular, an area in which the curvature correcting area is to be formed is immersed into the etching liquid 501 while the longitudinal direction of the raw base glass plate 32 is disposed to be parallel to the liquid surface 501a of the etching liquid 501. Then, the raw base glass plate 32 is etched by the etching liquid 501.

Here, since the container 502 has a drain hole 502a, the etching liquid 501b can be discharged at a desired flow rate. When the etching liquid 501b is discharged as described above, the liquid surface 501a of the etching liquid 501 inside the container 502 is lowered at a predetermined speed. Accordingly, a part of the raw base glass plate 32 that has been originally immersed in the etching liquid 501 is slowly exposed. As a result, the etching amount of the raw base glass plate 32 increases in accordance with a time during which the raw base glass plate is immersed in the etching liquid 501. Accordingly, a shape of the raw base glass plate 32 in which the lower-side facet immersed in the etching liquid 501 for the longest time becomes the thinnest, and the thickness increases toward the center portion in the width direction is formed. By performing such a process for the facets disposed on both sides, the base glass plate 31 having the desired curvature correcting areas W1 and W2 can be manufactured.

Figure 22:
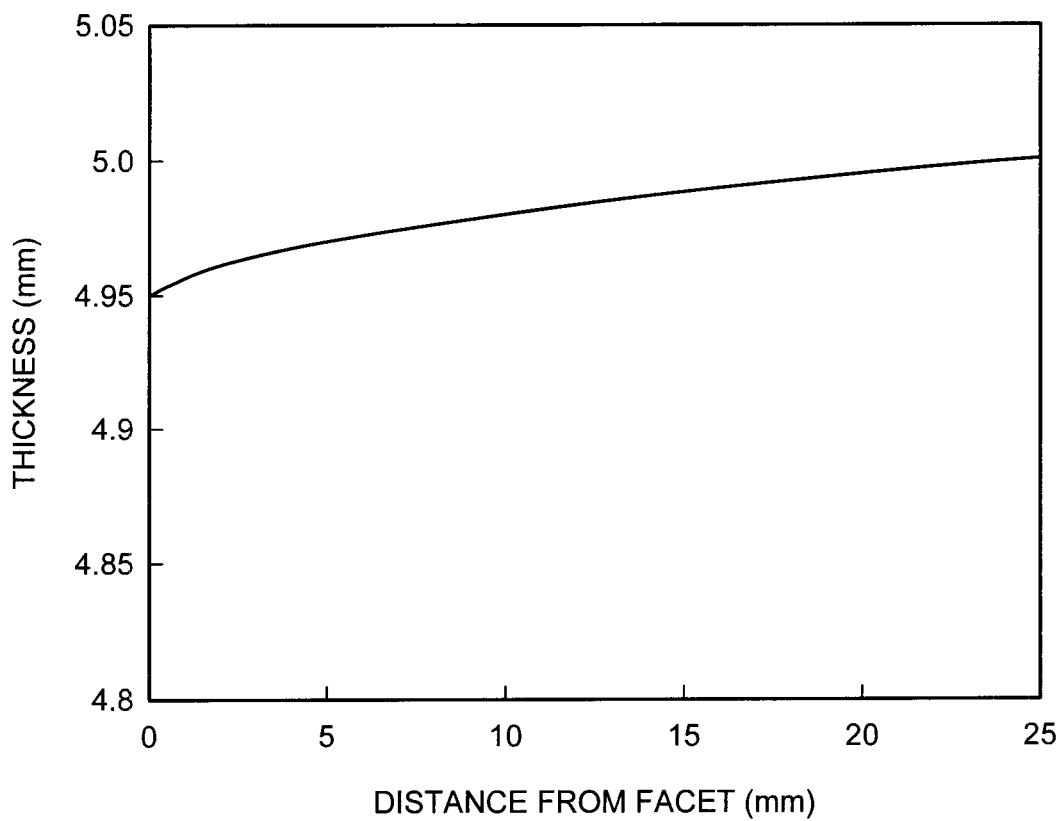
FIG. 22 is a diagram representing an example of the relationship between the distance from the facet of the base glass plate manufactured by using the etching method and the thickness.

FIG. 22 is a diagram representing an example of the relationship between the distance from the facet of the base glass plate manufactured by using the etching method and the thickness. The base glass plate represented in FIG. 22 is manufactured by immersing a raw base glass plate formed from quartz glass having a width of 50 mm and a thickness of 5.0 mm into a hydrofluoric acid solution of a predetermined density stored in the container and discharging the hydrofluoric acid solution from the container at a predetermined flow rate. As shown in FIG. 22, in this base glass plate, a curvature correcting area of which the thickness smoothly increases from the facet toward the center portion is formed by using the etching method. According to this etching method, the width of the curvature correcting area can be controlled in an easy manner by adjusting the depth of immersion of the raw base glass plate. The shape of the curvature correcting area can be controlled in an easy manner by adjusting the type or the density of the etching liquid or the flow rate of the discharged etching liquid.

Figure 23:
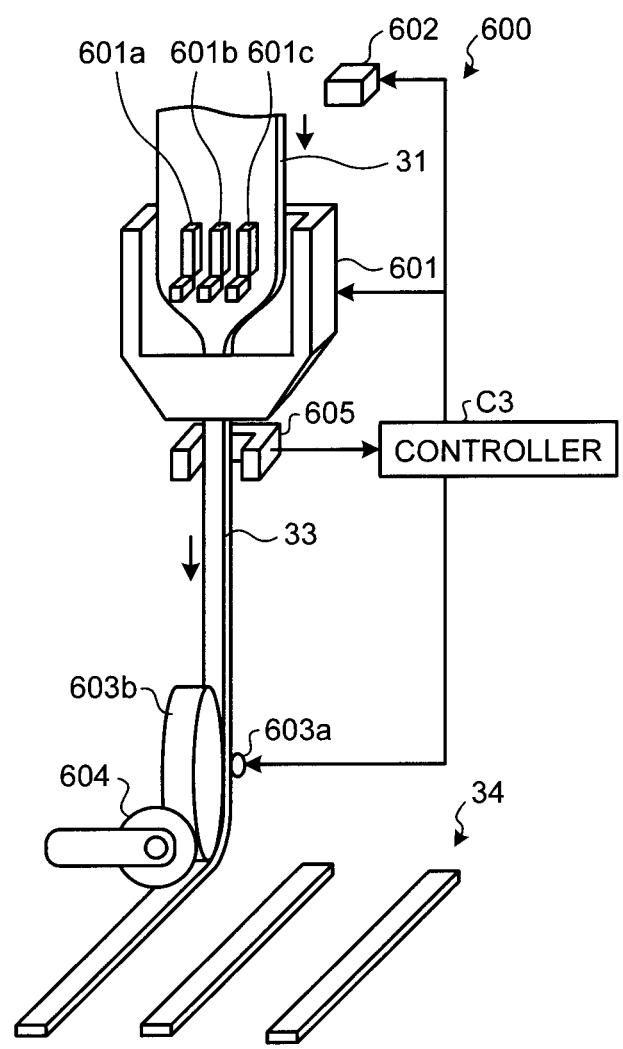
FIG. 23 is a schematic diagram of an example of a heating and stretching device used in a heating and stretching process of the fourth embodiment.

Next, the heating and stretching process of Step S302 will be described. FIG. 23 is a schematic diagram of an example of a heating and stretching device used in this heating and stretching process. As shown in FIG. 23, this heating and stretching device 600 includes: a heating furnace 601; a base feed mechanism 602; an outer diameter measuring unit 605; pickup mechanisms 603a and 603b; a cutter 604; and a controller C3.

The heating furnace 601 is an electric resistance furnace used for heating and stretching the base glass plate 31 and includes a plurality of heaters 601a to 601c disposed so as to face one main face of the base glass plate 31 as a heating means. In addition, the heating furnace 601 also includes a plurality of heaters disposed so as to face the other main face of the base glass plate 31. The base feed mechanism 602 is disposed on the upper side of the heating furnace 601 and feeds the base glass plate 31 in the longitudinal direction to the inside of the heating furnace 601 from the upper side of the heating furnace 601. In addition, the pickup mechanisms 603a and 603b are disposed on the lower side of the heating furnace 601 and pick up a glass plate 33 formed by heating and stretching the base glass plate 31. The outer diameter measuring unit 605 is disposed in the lower portion of the heating furnace 601 and measures the width or the thickness of the picked up glass plate 33. The cutter 604 is disposed on the back of the pickup mechanisms 603a and 603b and forms a groove on the surface of the glass plate 33 so as to be cleaved to have a predetermined length. The controller C3 is connected to the heating furnace 601, the base feed mechanism 602, the outer diameter measuring unit 605, and the pickup mechanisms 603a and 603b. This controller controls the temperature of the inside of the heating furnace 601, the base feed speed of the base feed mechanism 602, the pickup speed of the pickup mechanisms 603a and 603b, and the like based on a measured value measured by the outer diameter measuring unit 605.

Next, the method of heating and stretching the base glass plate 31 by using the heating and stretching device 600 will be described. First, by allowing each heater of the heating furnace 601 to be electrically conducted, the temperature of the inside of the furnace is adjusted to predetermined temperature equal to or higher than the softening temperature of the base glass plate 31. At this time, in order to increase the flatness, a temperature distribution may be formed in the width direction and the longitudinal direction of the base. Generally, it is preferable that the width direction is formed so as to increase the temperature of the end portion, and the longitudinal direction is formed so as to decrease the temperature gradient. Next, the base feed mechanism 602 feeds the base glass plate 31 to the inside of the heating furnace 601 with the longitudinal direction thereof facing the lower side. When the base glass plate 31 fed to the heating furnace 601 is heated to be at temperature equal to or higher than the softening temperature, the width thereof is contracted so as to be stretched to have a desired thickness.

Figure 39:
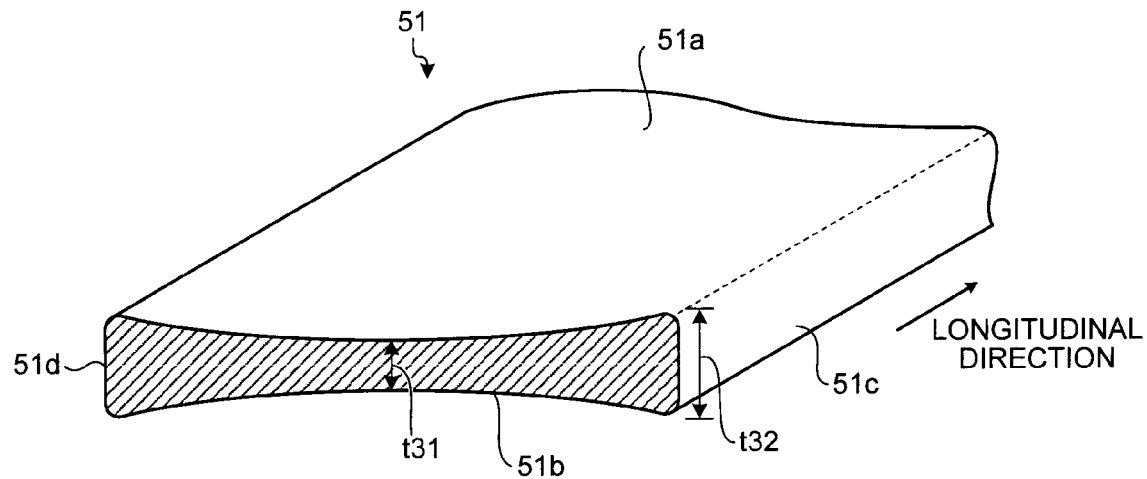
FIG. 39 is a perspective cross-sectional view of a glass plate manufactured by using a conventional heating and stretching method cut in a face perpendicular to the longitudinal direction thereof.
Figure 40:
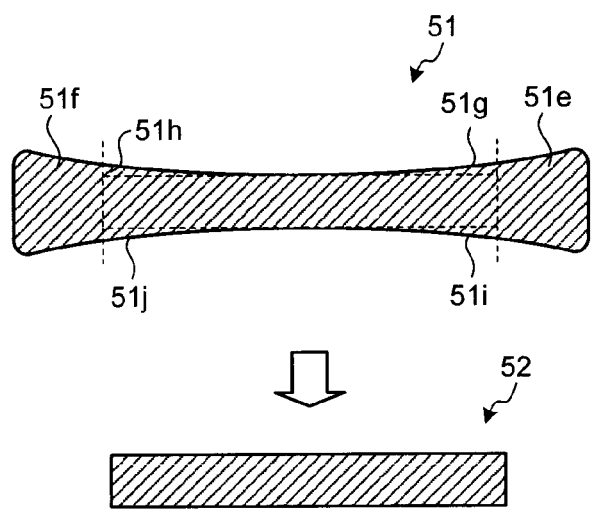
FIG. 40 is an explanatory diagram illustrating a method of manufacturing a glass plate having a high flatness of main faces from a glass plate shown in FIG. 39.

Here, the base glass plate 31 has the curvature correcting areas W1 and W2, in which the thicknesses t2 and t3 formed between the main faces 31a and 31b increases from each facet 31c and 31d toward the center portion in the width direction, along the longitudinal direction. Accordingly, the curved shape curved in the concave shape, as shown in FIG. 39, that has been originally generated at the time of the conventional heating and stretching process is corrected. Thus, a formed glass plate 33 has the main faces of which the flatness is high.

Thereafter, the formed glass plate 33 is picked up by the pickup mechanisms 603a and 603b, and the cutter 604 forms a groove on the surface of the glass plate 33 so as to be cleaved to have a predetermined length, whereby a glass plate 34 having a predetermined length is formed.

Figure 24:
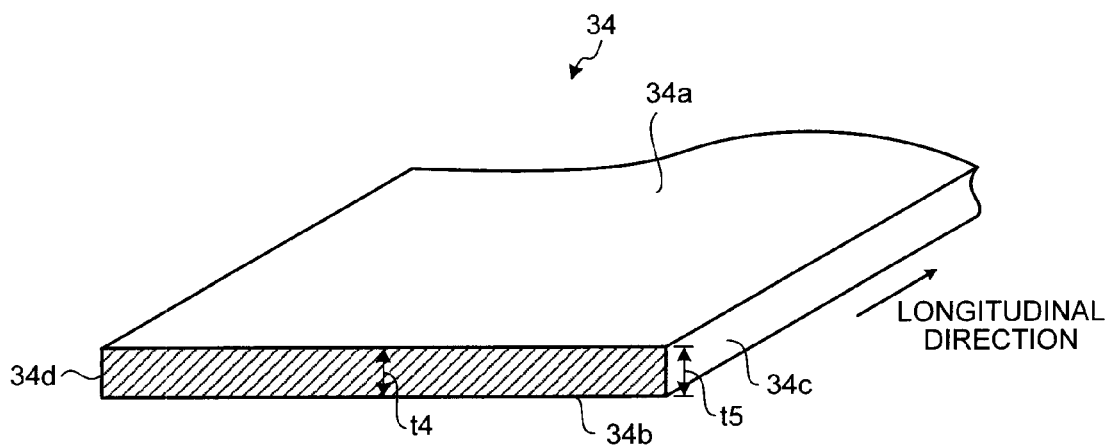
FIG. 24 is a perspective cross-sectional view of the cleaved glass plate cut in a face perpendicular to the longitudinal direction thereof.

FIG. 24 is a perspective cross-sectional view of the cleaved glass plate 34 cut in a face perpendicular to the longitudinal direction thereof. As shown in FIG. 24, this glass plate 34 has main faces 34a and 34b facing each other and facets 34c and 34d facing each other in the width direction. The facets 34c and 34d of the glass plate 34 are approximately parallel to each other along the longitudinal direction. In addition, in the main faces 34a and 34b, a thickness t4 of the center portion in the width direction and a thickness t5 of the end portion are approximately the same, and accordingly, the flatness of thereof is high.

Accordingly, since the flatness of the main faces 34a and 34b of the glass plate 34 is high without cutting both the end portions thereof or excessively polishing the main faces 34a and 34b, a portion to be wasted is smaller than that of a glass plate manufactured by using a conventional method, and a manufacturing process such as a cutting process or a polishing process is simplified. Thus, according to the manufacturing method of the fourth embodiment, the glass plate 34 that has the main faces having a high flatness can be manufactured at low cost in terms of both the material cost and the manufacturing cost.

When a difference between a maximum value and a minimum value of the thickness of the glass plate 34 between the main faces 34a and 34b in the width direction is equal to or less than 50 μm, similarly to the first embodiment, the glass plate 34 can be used for the purpose of a protective glass substrate such as cover glass for the entire area in the width direction including the facets 34c and 34d.

When a difference between a maximum value and a minimum value of the thickness of the glass plate 34 between the main faces 34a and 34b in the width direction is equal to or less than 10 μm, similarly to the first embodiment, the glass plate 34 can be used for the purpose of an HDD substrate by forming a hole in a circular ring shape therein.

When a difference between a maximum value and a minimum value of the thickness of the glass plate 34 between the main faces 34a and 34b in the width direction is equal to or less than 1 μm, similarly to the first embodiment, the glass plate 34 can be used as a glass substrate, which has flexibility over the entire area including the facets 34c and 34d in the width direction, for electronic devices.

In addition, similarly to the first embodiment, it is preferable that the shape of the main faces 31a and 31b in the curvature correcting areas W1 and W2 of the base glass plate 31 is determined based on at least one of the temperature distribution inside the heating furnace, the stretching speed, the pulling down rate, and the viscosity or the aspect ratio of the base glass plate. For example, when the pulling down rate is high, the main faces 31a and 31b are formed in a shape curved in a more convex shape in the curvature correcting areas W1 and W2. In addition, for example, the shapes of the main faces 31a and 31b in the curvature correcting area W1 may be formed to be different from each other in accordance with the symmetry of the temperature distribution inside the heating furnace, and the shape of the main face 31a may be formed to be different in the curvature correcting areas W1 and W2. As described above, it is preferable that the shapes of the main faces 31a and 31b are determined so as to offset the shape curved in a concave shape as much as possible, which is generated when the heating and stretching process is performed.

In addition, similarly to the first embodiment, the shapes of the main faces 31a and 31b of the base glass plate 31 in the curvature correcting areas W1 and W2 may be determined based on the shapes of formed test glass plates by preparing test base glass plates having different shapes of the curvature correcting areas and forming test glass plates by heating and stretching the test base glass plates as a test.

Figure 25:
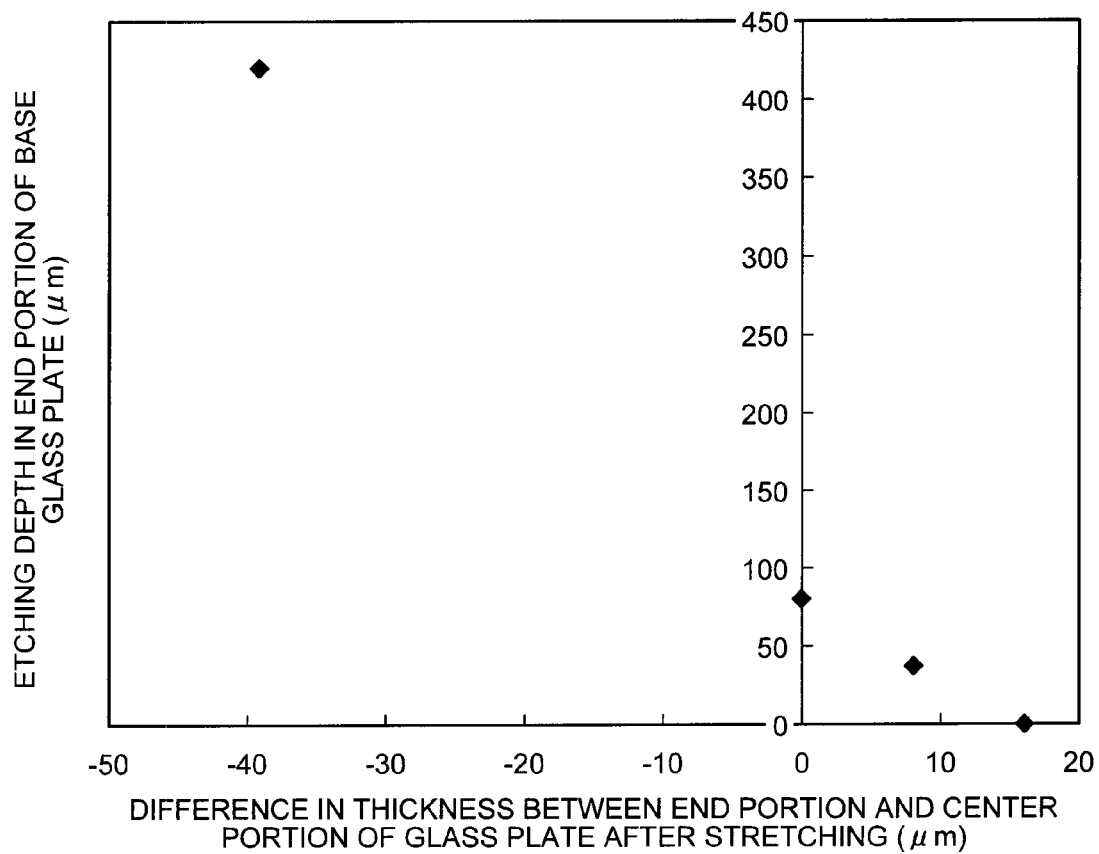
FIG. 25 is a diagram representing an example of the relationship between the etching depth in the end portion of a base glass plate prepared by using the etching method and a difference in the thickness of the end portion and the center portion of a glass plate acquired by stretching the base glass plate.

FIG. 25 is a diagram representing an example of the relationship between the etching depth in the end portion of a base glass plate prepared by using the etching method and a difference in the thickness of the end portion and the center portion of a glass plate acquired by stretching the base glass plate. In FIG. 25, four base glass plates, which were formed from borosilicate glass, having different etching depths were prepared, and glass plate were formed by heating and stretching the base glass plates under the condition in which the temperature inside the furnace was 1024° C., and the pulling down rate was 10. As shown in FIG. 25, the relationship between the etching depth of the base glass plate and the difference in the thickness of the glass plate is an approximate correlation. Thus, when the etching depth is about 80 μm, the difference in the thickness becomes zero. Accordingly, based on this result, a glass plate having a higher flatness can be manufactured by preparing a base glass plate manufactured so as to have an etching depth of 80 μm and heating and stretching the base glass plate.

Example 1 and Comparative Example 1

Figure 26:
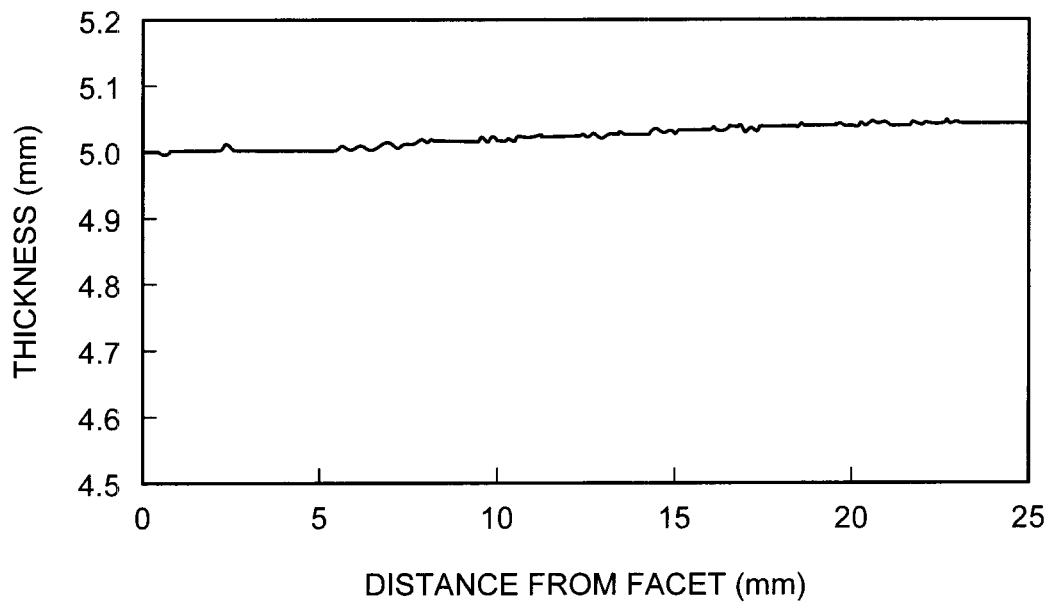
FIG. 26 is a diagram representing the relationship between the distance from one facet of the base glass plate according to Example 1 and the thickness.

As Example 1 of the present invention, a base glass plate was prepared by preparing a raw base glass plate, which was formed from borosilicate glass (TEMPAX Float (registered trademark) manufactured by Schott Glaswerk), having the main faces and the facets respectively facing each other that were respectively parallel to each other and having a width of 50 mm, a thickness of 5.05 mm, a length of about 550 mm, and an aspect ratio of 9.9 and etching each facet of the raw base glass plate in the width direction to the center portion by using the etching method using a hydrofluoric acid solution. FIG. 26 is a diagram representing the relationship between the distance from one facet of the base glass plate according to Example 1 and the thickness. As shown in FIG. 26, the thickness of the base glass plate according to Example 1 was 5.0 mm in the end portion in the width direction and smoothly increased toward the center portion, and in a position in which the distance was 25 mm as the center portion, the thickness was 5.05 mm.

Next, the base glass plate according to this Example 1 was set in a heating and stretching device having the structure as shown in FIG. 23, and the base glass plate was heated and stretched so as to have a pulling down rate of 10 while appropriately controlling the temperature inside the heating furnace in the range of 900° C. to 1170° C., whereby a glass plate was formed. On the other hand, as Comparative Example 1, the raw base glass plate according to Example 1 was heated and stretched under the same condition as that of Example 1, whereby a glass plate was formed.

Figure 27:
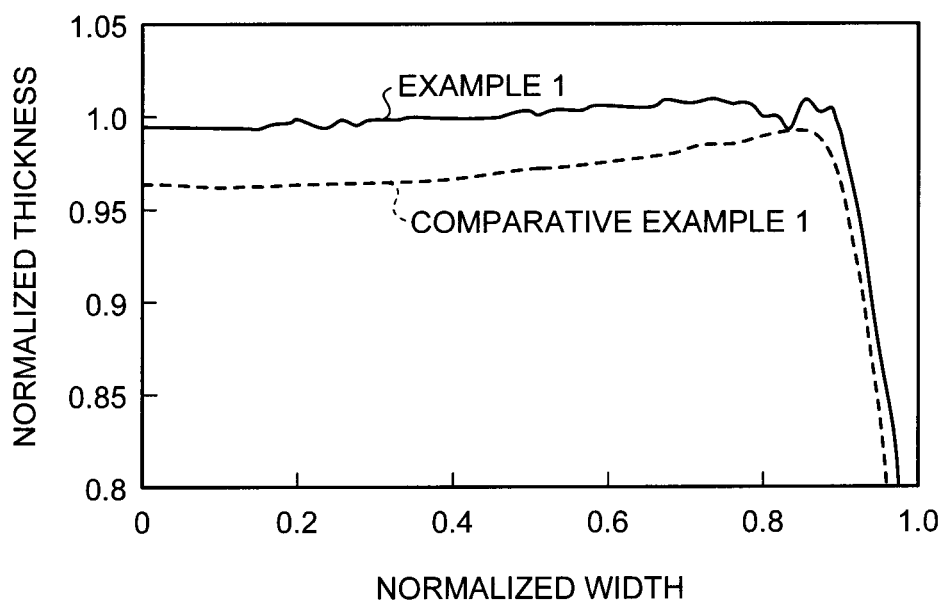
FIG. 27 is a diagram representing the relationship between the normalized width of the glass plate from the center portion thereof in the width direction to one facet and the normalized thickness of the glass plate according to Example 1 and Comparative Example 1.

FIG. 27 is a diagram representing the relationship between the normalized width of the glass plate from the center portion thereof in the width direction to one facet and the normalized thickness of the glass plate according to Example 1 and Comparative Example 1. Here, a normalized width is a width of each glass plate from the center portion thereof in the width direction normalized by a value of a half of the entire width thereof, and a normalized thickness is a thickness of each glass plate normalized by its maximum value. As shown in FIG. 27, the glass plate according to Example 1 had a normalized thickness that was approximately uniform from the center portion to the facet, and a difference in a maximum value and a minimum value of the normalized thickness was about 0.004. On the other hand, the glass plate according to Comparative Example 1 had a normalized thickness that was the minimum in the center portion and increased toward the end portion, and the normalized thickness was the maximum in the end portion. In the case of Comparative Example 1, a difference between the maximum value and the minimum value of the normalized thickness was large as being about 0.03.

Accordingly, in a case where a glass plate in which a difference between the maximum value and the minimum value of the thickness is defined to be equal to or less than 10 μm as the flatness of the main faces is manufactured, the glass plate according to Example 1 can be manufactured as a glass plate having the desired flatness without performing fine polishing for finishing for the main faces. However, in the case of the glass plate of Comparative Example 1, in order to manufacture a glass plate having the desired flatness, both end portions corresponding to a normalized thickness of about 0.025 must be wasted through a fine polishing process for finishing. This wasted portion corresponds to about 2% of the entire glass plate, and accordingly, the glass material is wasted much. Above all, since a polishing process is added, the number of processes is increased, whereby the cost is increased.

Fifth Embodiment

In the above-described the fourth embodiment 4, both the curvature correcting areas W1 and W2 of the base glass plate 31 extend from the facets 31c and 31d to the center portion in the width direction. However, the present invention is not limited thereto, and a base glass plate that has a parallel area between the curvature correcting areas in which the main faces are parallel to each other may be prepared.

Figure 28:
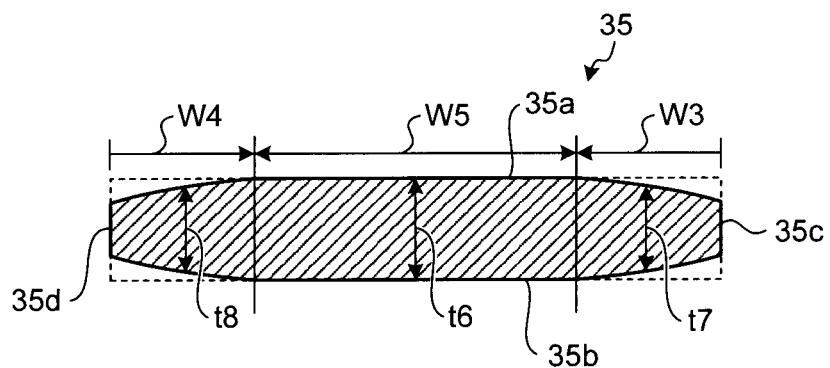
FIG. 28 is a cross-sectional view of a base glass plate, which is prepared in the method of manufacturing a glass plate according to a fifth embodiment, cut in a face perpendicular to the longitudinal direction thereof.

FIG. 28 is a cross-sectional view of a base glass plate, which is prepared in the method of manufacturing a glass plate according to the fifth embodiment of the present invention, cut in a face perpendicular to the longitudinal direction thereof. As shown in FIG. 28, this base glass plate 35, similarly to the base glass plate 31 according to the fourth embodiment, has main faces 35a and 35b facing each other and facets 35c and 35d facing each other in the width direction. The facets 35c and 35d are approximately parallel to each other along the longitudinal direction. The thickness of the base glass plate 35 between the main faces 35a and 35b is a thickness t6 in the center portion thereof in the width direction. In addition, this base glass plate 35 has a curvature correcting area W3, in which a thickness t7 between the main faces 35a and 35b increases from the facet 35c toward the center portion in the width direction, along the longitudinal direction. In addition, this base glass plate 35 has a curvature correcting area W4, in which a thickness t8 between the main faces 35a and 35b increases from the facet 35d toward the center portion in the width direction, along the longitudinal direction. However, this base glass plate 35, differently from the base glass plate 31, has a parallel area W5 in which the main faces 35a and 35b are parallel to each other between the curvature correcting areas W3 and W4.

When this base glass plate 35 is heated and stretched as in Step S302 of the fourth embodiment, the main face is curved in the parallel area W5. Accordingly, there is a difference between the thickness of the end portion of the area and the center portion. However, in the curvature correcting areas W3 and W4 in which the curvature is generated the most markedly due to their positions located in the end portions of the base glass plate 35, similarly to the fourth embodiment, the curved shape is corrected, and the curvature generated in the main face in the parallel area W5 is decreased much. As a result, the formed glass plate has high a flatness of the main faces. Thus, according to the fifth embodiment, a portion to be wasted is smaller than that of a conventional case. In addition, a manufacturing process such as a cutting process or a polishing process is simplified, and accordingly, a glass plate having a high flatness of the main faces can be manufactured at low cost.

The width of the curvature correcting areas W3 and W4 may be set appropriately in accordance with a desired flatness of the main faces. For example, the width is set to be in the range of about 5% to 50% of the entire width of the base glass plate 35, and is more preferably set in the range of about 20% to 50% of the entire width.

Example 2

A raw base glass plate that is the same as that of Example 1 was prepared, areas of the raw base glass plate up to 10 mm from each facet in the width direction were etched as the curvature correcting areas by using the etching method using a hydrofluoric acid solution, and the base glass plate was prepared by setting an area having a width of 30 mm between the curvature correcting areas as the parallel area. In addition, etching was performed such that the thickness in each end portion became 4.5 mm.

Next, the base glass plate according to this Example 2 was heated and stretched in the same condition as that of Example 1, whereby a glass plate was formed. Then, the thickness of this glass plate was measured, and a difference in the maximum value and the minimum value of the normalized thickness extending from the center portion to the facet was about 0.02.

Sixth Embodiment

According to the above-described fourth and fifth embodiments, in the base glass plates 31 and 35, both the curvature correcting areas W1 and W2 have curved shapes. However, the present invention is not limited thereto. Thus, as the base glass plate, a base glass plate that has the curvature correcting areas not in a curved shape but in a straight-line shape may be prepared.

Figure 29:
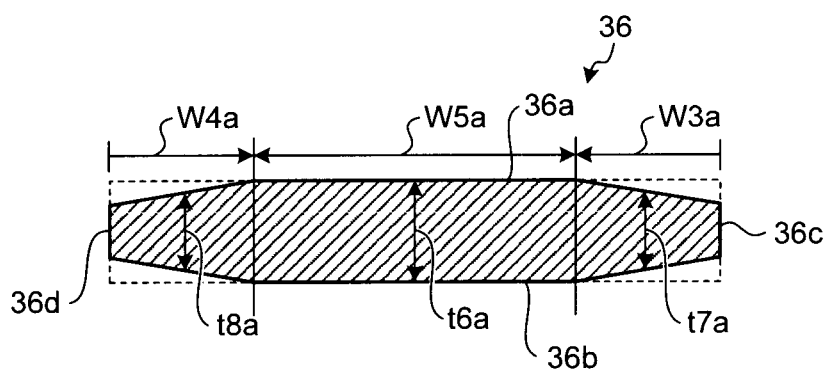
FIG. 29 is a cross-sectional view of a base glass plate, which is prepared in the method of manufacturing a glass plate according to a sixth embodiment of the present invention, cut in a face perpendicular to the longitudinal direction thereof.

FIG. 29 is a cross-sectional view of a base glass plate, which is prepared in the method of manufacturing a glass plate according to a sixth embodiment of the present invention, cut in a face perpendicular to the longitudinal direction thereof. As shown in FIG. 29, this base glass plate 36, similarly to the base glass plate 35 according to the fifth embodiment, has main faces 36a and 36b facing each other and facets 36c and 36d facing each other in the width direction. The facets 36c and 36d are approximately parallel to each other along the longitudinal direction. The thickness of the base glass plate 36 between the main faces 36a and 36b is a thickness t6a in the center portion thereof in the width direction. In addition, this base glass plate 36 has a curvature correcting area W3a, in which a thickness t7a between the main faces 36a and 36b increases in a linear shape from the facet 36c toward the center portion in the width direction, along the longitudinal direction. In addition, this base glass plate 36 has a curvature correcting area W4a, in which a thickness t8a between the main faces 36a and 36b increases in a linear shape from the facet 36d toward the center portion in the width direction, along the longitudinal direction. Furthermore, this base glass plate 36 has a parallel area W5a in which the main faces 36a and 36b are parallel to each other between the curvature correcting areas W3a and W4a.

When this base glass plate 36 is heated and stretched as in Step S302 of the fourth embodiment, the main face is curved in the parallel area W5a. Accordingly, there is a difference between the thickness of the end portion of the area and the center portion. However, in the curvature correcting areas W3a and W4a in which the curvature is generated the most markedly due to their positions located in the end portions of the base glass plate 36, similarly to the fifth embodiment, the curved shape is corrected, and the curvature generated in the main face in the parallel area W5a is decreased much. As a result, the formed glass plate has high a flatness of the main faces. Thus, according to the sixth embodiment, a portion to be wasted is smaller than that of a conventional case. In addition, a manufacturing process such as a cutting process or a polishing process is simplified, and accordingly, a glass plate having a high flatness of the main faces can be manufactured at low cost.

The width of the curvature correcting areas W3a and W4a may be set appropriately in accordance with a desired flatness of the main faces. For example, the width is set to be in the range of about 5% to 50% of the entire width of the base glass plate 36, and is more preferably set in the range of about 20% to 50% of the entire width.

Seventh Embodiment

Figure 30:
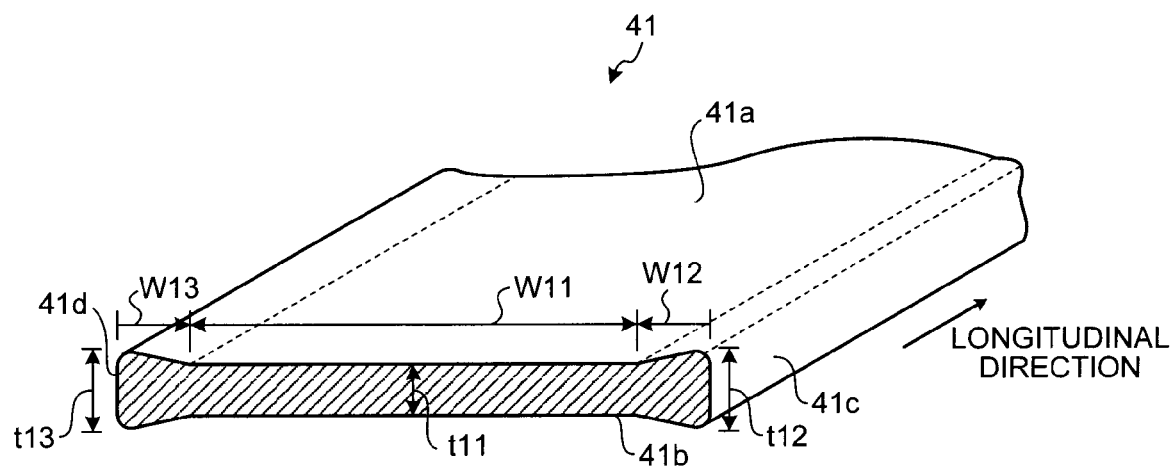
FIG. 30 is a perspective cross-sectional view of a glass plate manufactured by using a method of manufacturing a glass plate according to a seventh embodiment.

FIG. 30 is a perspective cross-sectional view of a glass plate manufactured by using a method of manufacturing a glass plate according to a seventh embodiment of the present invention. As shown in FIG. 30, this glass plate 41 has main faces 41a and 41b facing each other and facets 41c and 41d facing each other in the width direction. The facets 41c and 41d are approximately parallel to each other along the longitudinal direction. In addition, this glass plate 41 has spacer portions W12 and W13 formed to have a predetermined width from each facet 41c or 41d in the width direction and a parallel portion W11, in which the main faces 41a and 41b are parallel to each other, formed between the spacer portions W12 and W13. In the parallel portion W11, a thickness formed between the main faces 41a and 41b is a thickness t11 and is approximately constant. In addition, the spacer portions W12 and W13 have portions having a thickness slowly increasing from the parallel portion W11 side, and the maximum thicknesses thereof are t12 and t13.

Figure 31:
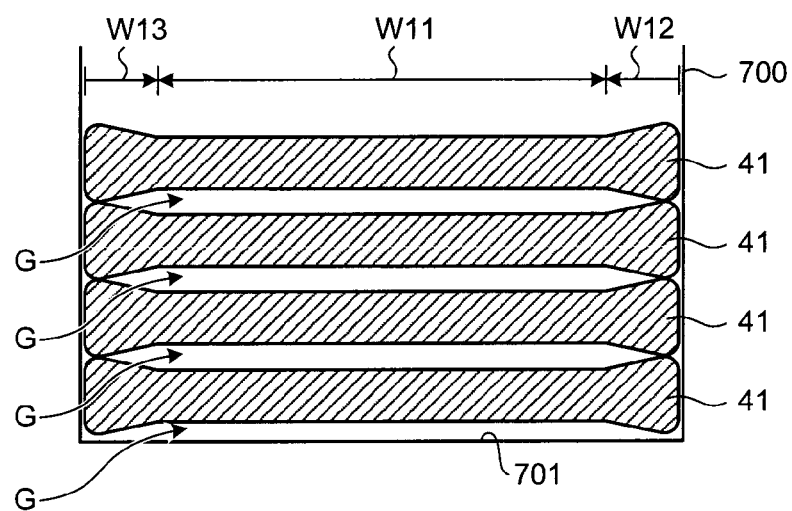
FIG. 31 is a diagram showing a state in which a plurality of the glass plates shown in FIG. 30 is stacked inside a housing container.

FIG. 31 is a diagram showing a state in which a plurality of the glass plates 41 shown in FIG. 30 is stacked inside a housing container 700. As shown in FIG. 31, when the glass plates 41 are stacked, a gap G between the main faces or the main face and the bottom face 701 of the housing container 700 is generated due to the spacer portions W12 and W13. Accordingly, the main faces or the main face and the bottom face 701 are not brought into contact with each other in the parallel portion W11, whereby the main faces are prevented from being damaged.

Next, a method of manufacturing a glass plate 41 shown in FIG. 30 will be described. FIG. 32 is a flowchart of a method of manufacturing a glass plate according to the seventh embodiment. As shown in FIG. 32, in the method of manufacturing a glass plate according to the seventh embodiment, first, a base glass plate is prepared (Step S401). Next, the base glass plate prepared in Step S401 is heated and stretched (Step S402). Hereinafter, each process will be described in detail.

First, a base glass plate preparing process of Step S401 will be described. FIG. 33 is a perspective cross-sectional view of a base glass plate, which is prepared in the base glass plate preparing process, cut in a face perpendicular to the longitudinal direction thereof. As shown in FIG. 33, this base glass plate 42 has main faces 42a and 42b facing each other and facets 42c and 42d facing each other in the width direction. The facets 42c and 42d are approximately parallel to each other along the longitudinal direction. The thickness of the base glass plate 42 between the main faces 42a and 42b is a thickness t18 in the center portion thereof in the width direction. In addition, this base glass plate 42 has spacer portions W14 and W15 formed to have a predetermined width from the facets 42c and 42d and curvature correcting areas W16 and W17 formed adjacent to the spacer portion forming areas W14 and W15, along the longitudinal direction. In the curvature correcting areas W16 and W17, thicknesses t16 and t17 formed between the main faces 42a and 42b increase from sides of the facets 42c and 42d to the center portion in the width direction. In addition, both the curvature correcting areas W16 and W17 extend up to the center portion of the base glass plate 42 in the width direction. In the spacer portion forming areas W14 and W15, the thicknesses t14 and t15 formed between the main faces are constant from the sides of the facets 42c and 42d toward the center portion. According to the seventh embodiment, the thicknesses t14 and t15 are constant, respectively. However, the thicknesses t14 and t15 may increase more gently than the curvature correcting areas W16 and W17 adjacent to the spacer portion forming areas W14 and W15.

The material of the base glass plate 42 is not particularly limited and is appropriately selected in accordance with the use of the glass plate to be manufactured. For example, the same material as that of the base glass plate 10 according to the first embodiment can be used.

In addition, the method of preparing the base glass plate 42 having the spacer portion forming areas W14 and W15 and the curvature correcting areas W16 and W17 is not particularly limited. Thus, a known method, for example, that is the same as in the case of the base glass plate 10 according to the first embodiment such as a press method, a down-draw method, or an up-draw method may be used. Alternatively, the base glass plate 42 may be prepared by using a method described as below.

Figure 34:
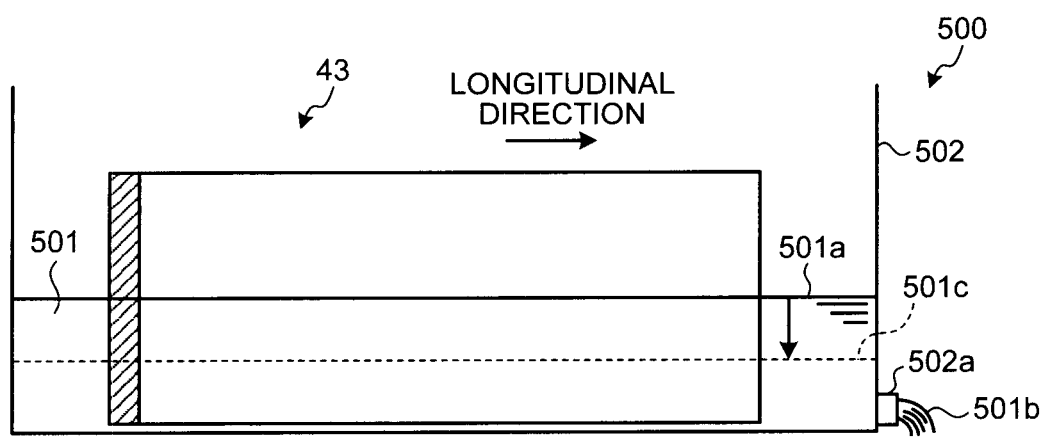
FIG. 34 is an explanatory diagram illustrating an example of a method of preparing the base glass plate shown in FIG. 33.

FIG. 34 is an explanatory diagram illustrating an example of a method of preparing the base glass plate 42 shown in FIG. 33. The method shown in FIG. 34 is an etching method that is the same as the method shown in FIG. 21. As shown in FIG. 34, a raw base glass plate 43, which has main faces parallel to each other, formed, for example, by using a known float method or the like is prepared. Then, the raw base glass plate 43 is immersed into an etching liquid 501 such as a hydrofluoric acid solution stored in a container 502 of an etching device 500. At this time, an area of the raw base glass plate 43 that has a predetermined width from one facet thereof in the width direction, in particular, an area in which the spacer portion forming area and the curvature correcting area are to be formed is immersed into the etching liquid 501 while the longitudinal direction of the raw base glass plate 43 is disposed to be parallel to the liquid surface 501a of the etching liquid 501. Then, the raw base glass plate 43 is etched by the etching liquid 501.

Here, since the container 502 has a drain hole 502a, the etching liquid 501b can be discharged at a desired flow rate. When the etching liquid 501b is discharged as described above, the liquid surface 501a of the etching liquid 501 inside the container 502 is lowered at a predetermined speed. Accordingly, a part of the raw base glass plate 43 that has been originally immersed in the etching liquid 501 is slowly exposed. As a result, the etching amount of the raw base glass plate 43 increases in accordance with a time during which the raw base glass plate is immersed in the etching liquid 501. Then, when the liquid surface 501a is lowered so as to reach a liquid surface 501c corresponding to the boundary between the spacer portion forming area and the curvature correcting area, the raw base glass plate 43 is taken out from the etching liquid 501. Then, the raw base glass plate 43 becomes thinner in the curvature correcting area toward the lower side immersed in the etching liquid 501 for a longer time, and a shape in which the thickness increases toward the center portion in the width direction is formed. In addition, the spacer portion forming area is approximately the same as the lower end of the curvature correcting area so as to have a constant thickness. By performing such a process for the facets disposed on both sides, the base glass plate 42 having desired spacer portion forming areas W14 and W15 and desired curvature correcting areas W16 and W17 can be manufactured.

Figure 35:
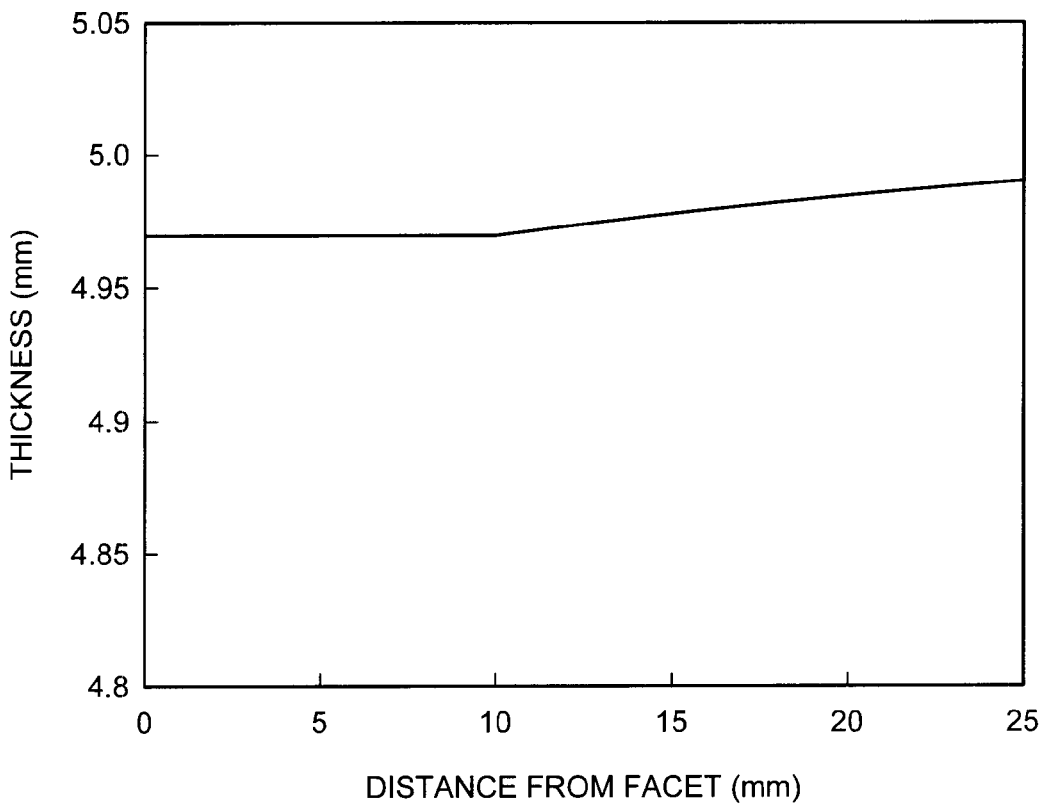
FIG. 35 is a diagram representing an example of the relationship between the distance from the facet of the base glass plate manufactured by using the etching method and the thickness.

FIG. 35 is a diagram representing an example of the relationship between the distance from the facet of the base glass plate manufactured by using the etching method and the thickness. The base glass plate represented in FIG. 35 is manufactured by immersing a raw base glass plate formed from borosilicate glass having a width of 470 mm and a thickness of 5.0 mm into a hydrofluoric acid solution, which has a predetermined density, stored in a container, discharging the hydrofluoric acid solution from the container at a predetermined flow rate, and taking out the raw base glass plate from the hydrofluoric acid solution at a time point when the liquid surface reaches a predetermined position. As shown in FIG. 35, in this raw base glass plate, by using the etching method, a spacer portion forming area having a constant thickness up to the area that is 10 mm apart from the facet is formed, and the curvature correcting area in which the thickness smoothly increases toward the center portion is formed so as to be adjacent to the spacer portion forming area. According to the etching method, the width of the spacer portion forming area or the curvature correcting area can be easily controlled by adjusting the depth of immersion of the raw base glass plate. Accordingly, the shape of the spacer portion forming area or the curvature correcting area can be easily controlled by adjusting the type or the density of the etching liquid or the flow rate of the discharged etching liquid. For example, in the process shown in FIG. 34, when the liquid surface of the etching liquid 501 reaches the liquid surface 501c, by decreasing the discharge speed of the etching liquid 501b without taking out the raw base glass plate 43 from the etching liquid 501, a base glass plate in which the thickness of each spacer portion forming area W14 or W15 gently increases toward the center portion can be manufactured. In addition, by moving the raw base glass plate 43 without moving the liquid surface of the etching liquid 501, the relative position between the raw base glass plate 43 and the liquid surface can be controlled as described above. Furthermore, the base glass plate 42 may be prepared by mechanical grinding.

Next, the heating and stretching process of Step S402 will be described. In this heating and stretching process, for example, the heating and stretching device 600 shown in FIG. 23 is used. First, by allowing each heater of the heating furnace 601 to be electrically conducted, the temperature of the inside of the furnace is adjusted to predetermined temperature equal to or higher than the softening temperature of the base glass plate 42. Next, the base feed mechanism 602 feeds the base glass plate 42 to the inside of the heating furnace 601 with the longitudinal direction thereof facing the lower side. When the base glass plate 42 fed to the heating furnace 601 is heated to be at temperature equal to or higher than the softening temperature, the width thereof is contracted so as to be stretched to have a desired thickness, whereby a glass plate is formed.

Here, the base glass plate 42 has the spacer portion forming areas W14 and W15, in which the thicknesses t14 and t15 formed between the main faces 42a and 42b are constant, formed from the facets 42c and 42d so as to have a predetermined width, along the longitudinal direction. Accordingly, in the spacer portion forming areas W14 and W15, similarly to a conventional case, the thickness formed between the main faces 42a and 42b is curved in a convex shape so as to increase once and then decrease toward the center portion. On the other hand, this base glass plate 42 has the curvature correcting areas W16 and W17, in which the thicknesses t16 and t17 formed between the main faces 42a and 42b increase from the sides of the facets 42c and 42d toward the center portion in the width direction, along the longitudinal direction. Accordingly, a curved shape curved in a concave shape is corrected in the curvature correcting areas W16 and W17. As a result, in the curvature correcting areas W16 and W17, the main faces 42a and 42b are parallel to each other, and in the spacer portion forming areas W14 and W15, the main faces 42a and 42b protrude from the curvature correcting areas W16 and W17. In addition, even in a case where the thicknesses t14 and t15 formed between the main faces 42a and 42b are not constant in the spacer portion forming areas W14 and W15, when the thickness increases more gently than the curvature forming areas W16 and W17 adjacent thereto, the main faces 42a and 42b protrude from the curvature correcting areas W16 and W17.

Thereafter, the formed glass plate is picked up by the pickup mechanisms 603a and 603b, and the cutter 604 forms a groove on the surface of the glass plate so as to be cleaved to have a predetermined length as shown in FIG. 30, whereby a glass plate 41 having the parallel portion W11 and the spacer portions W12 and W13 is formed.

When being used for a desired purpose such as manufacture of a magnetic disk substrate, this glass plate 41 is used by cutting the spacer portions W12 and W13 off. However, these spacer portions W12 and W13 are intentionally formed so as to have a predetermined width. Thus, a width to be cut off can be smaller than that of a glass plate manufactured by using a conventional method. Since the parallel portion W11 of this glass plate 41 is formed by correcting the curvature thereof by using the curvature correcting areas W16 and W17, the flatness thereof is higher than that of a conventional case. Thus, after the spacer portions W12 and W13 are cut off, the main faces 41a and 41b of this glass plate 41 do not need to be excessively polished. Accordingly, a portion of the glass plate 41 to be wasted is smaller than that of a glass plate manufactured by using a conventional method, and a manufacturing process such as a cutting process or a polishing process is simplified.

As described above, according to the manufacturing method of the seventh embodiment, a glass plate 41 that has a high flatness of the main faces and can prevent the main faces from being damaged at the time of a stacking process can be manufactured at low cost in terms of both the material cost and the manufacturing cost.

In this glass plate 41, when a difference between the maximum value and the minimum value of the thickness formed between the main faces 41a and 41b in the parallel portion W11 is equal to or less than 10 µm, the entire area in the width direction after cut of the spacer portions W12 and W13 can be used for the purpose of a blank of a hard disk or the like. When the width of each of the spacer portions W12 and W13 is in the range of 4% to 40% of the entire width of the glass plate 41, the damage preventing effect can be sufficiently acquired, and the width to be cut off can be much smaller than that of a conventional case. Accordingly, it is preferable that a base glass plate 42 in which the width of each of the spacer portion forming areas W14 and W15 is in the range of 4% to 40% of the entire width is prepared.

In addition, similarly to the first embodiment, it is preferable that the shape of the main faces 42a and 42b in the curvature correcting areas W16 and W17 of the base glass plate 42 is determined based on at least one of the temperature distribution inside the heating furnace, the stretching speed, the pulling down rate, and the viscosity or the aspect ratio of the base glass plate. For example, when the pulling down rate is high, the main faces 42a and 42b are formed in a shape curved in a more convex shape in the curvature correcting areas W16 and W17. In addition, for example, the shapes of the main faces 42a and 42b in the curvature correcting area W16 may be formed to be different from each other in accordance with the symmetry of the temperature distribution inside the heating furnace, and the shape of the main face 42a may be formed to be different in the curvature correcting areas W16 and W17. As described above, it is preferable that the shapes of the main faces 42a and 42b are determined so as to offset the shape curved in a concave shape as much as possible, which is generated when the heating and stretching process is performed.

In addition, similarly to first embodiment, the shapes of the main faces 42a and 42b of the base glass plate 42 in the curvature correcting areas W16 and W17 may be determined based on the shapes of formed test glass plates by preparing test base glass plates having different shapes of the curvature correcting areas and forming test glass plates by heating and stretching the test base glass plates as a test.

Example 3 and Comparative Example 2

Figure 36:
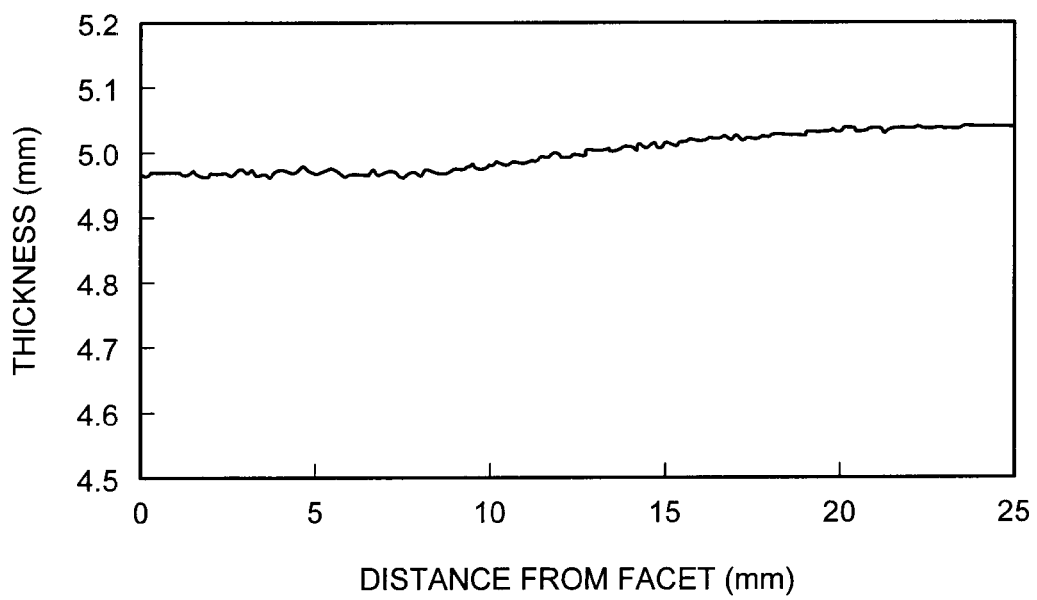
FIG. 36 is a diagram representing the relationship between the distance from one facet of the base glass plate according to the third embodiment and the thickness.

As Example 3 of the present invention, a base glass plate was prepared by preparing a raw base glass plate, which was formed from borosilicate glass (TEMPAX Float (registered trademark) manufactured by Schott Glaswerk), having the main faces and the facets respectively facing each other that were respectively parallel to each other and having a width of 470 mm, a thickness of 5.05 mm, and a length of about 2000 mm and etching each facet of the raw base glass plate in the width direction to the center portion by using the etching method using a hydrofluoric acid solution. FIG. 36 is a diagram representing the relationship between the distance from one facet of the base glass plate according to the third embodiment and the thickness. As shown in FIG. 36, the thickness of the base glass plate according to Example 3 was almost constant as being 4.73 mm up to a position apart from the end portion by about 20 mm, thereafter smoothly increased toward the center portion, and was 5.05 mm in a position apart from the end portion by 235 mm, which was a center portion.

Next, the base glass plate according to this Example 3 was set in a heating and stretching device having the structure as shown in FIG. 23, and the base glass plate was heated and stretched so as to have a pulling down rate of 7 while appropriately controlling the temperature inside the heating furnace in the range of 900° C. to 1170° C., whereby a glass plate was formed. On the other hand, as Comparative Example 2, the raw base glass plate according to Example 2 was heated and stretched under the same condition as that of Example 3, whereby a glass plate was formed.

Figure 37:
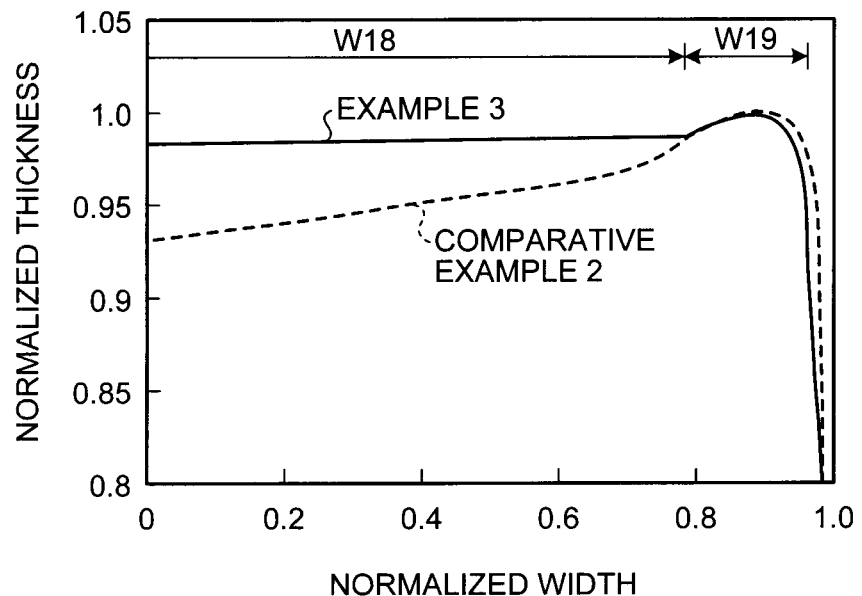
FIG. 37 is a diagram representing the relationship between the normalized width of the glass plate from the center portion thereof in the width direction to one facet and the normalized thickness of the glass plate according to Example 3 and Comparative Example 2.

FIG. 37 is a diagram representing the relationship between the normalized width of the glass plate from the center portion thereof in the width direction to one facet and the normalized thickness of the glass plate according to Example 3 and Comparative Example 2. As shown in FIG. 37, in the glass plate according to Example 3, the normalized thickness was almost uniform in an area W18 in which a normalized width from the center portion was about 0.93, and in an area W19 adjacent thereto, a spacer portion having large normalized thickness is formed. In addition, the difference between the maximum value and the minimum value of the normalized thickness was about 0.004 in an area W18. On the other hand, in the glass plate according to Comparative Example 2, the normalized thickness was the minimum in the center portion, increased toward the end portion, and was the maximum in the end portion. In the case of Comparative Example 2, the difference between the maximum value and the minimum value of the normalized thickness in the area W18 was large as being about 0.07.

Accordingly, in a case where a glass plate in which a difference between the maximum value and the minimum value of the thickness is defined to be equal to or less than 10 µm as the flatness of the main faces is manufactured, a glass plate having a desired flatness can be manufactured by performing a process of cutting off only the spacer portions disposed on both end portions of the glass plate according to Example 3 so as to be avoided and only performing a fine polishing process for finishing for the main faces. However, in the case of the glass plate of Comparative Example 2, in order to implement the desired flatness only by performing a polishing process for manufacturing a glass plate having the desired flatness without cutting off both end portions, a polishing process for an extremely long time is necessary.

Eighth Embodiment

In the above-described seventh embodiment, in the base glass plate 42, both the curvature correcting areas W16 and W17 extend to the center portion in the width direction. However, the present invention is not limited thereto. Thus, a base glass plate having a parallel area in which the main faces are parallel to each other between the curvature correcting areas may be prepared.

Figure 38:
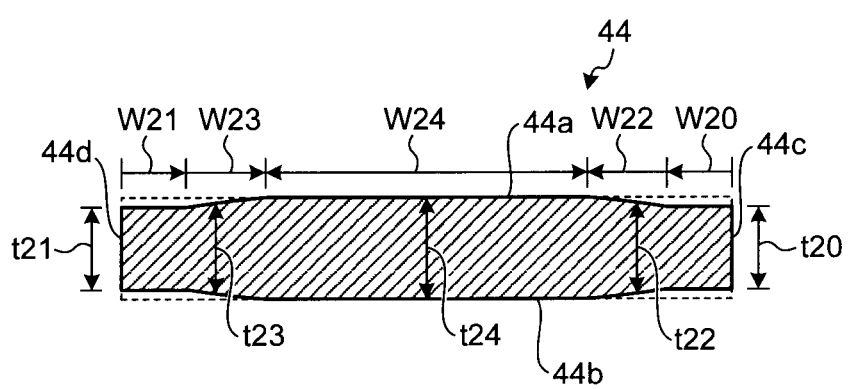
FIG. 38 is a cross-sectional view of a base glass plate, which is prepared in the method of manufacturing a glass plate according to an eighth embodiment, cut in a face perpendicular to the longitudinal direction thereof.

FIG. 38 is a cross-sectional view of a base glass plate, which is prepared in the method of manufacturing a glass plate according to the eighth embodiment of the present invention, cut in a face perpendicular to the longitudinal direction thereof. As shown in FIG. 38, this base glass plate 44, similarly to the base glass plate 42 according to the seventh embodiment, has main faces 44a and 44b facing each other and facets 44c and 44d facing each other in the width direction. The facets 44c and 44d are approximately parallel to each other along the longitudinal direction. The thickness of the base glass plate 44 between the main faces 44a and 44b is a thickness t24 in the center portion thereof in the width direction. In addition, this base glass plate 44 has spacer portion forming areas W20 and W21 formed from the facets 44c and 44d so as to have a predetermined width and curvature correcting areas W22 and W23 formed adjacent to the spacer portion forming areas W20 and W21, in the longitudinal direction. In the curvature correcting areas W22 and W23, thicknesses t22 and t23 formed between the main faces 44a and 44b increase from the sides of the facets 44c and 44d toward the center portion in the width direction. In addition, in the spacer portion forming areas W20 and W21, each of the thicknesses t20 and t21 formed between the main faces t20 and t21 is constant from the sides of the facets 44c and 44d toward the center portion. However, this base glass plate 44, differently from the base glass plate 42, has a parallel area W24 in which the main faces 44a and 44b are parallel to each other between the curvature correcting areas W22 and W23.

When this base glass plate 44 is heated and stretched as in Step S402 of the seventh embodiment, the main face is slightly curved in the parallel area W24. Accordingly, there is a difference between the thickness of the end portion of the area and the center portion. However, in the curvature correcting areas W22 and W23 in which the curvature is generated more markedly due to their positions located close to the end portions of the base glass plate 44, similarly to the sixth embodiment, the curved shape is corrected, and the curvature generated in the main face in the parallel area W24 is decreased much. As a result, the formed glass plate has a high flatness of the main faces. Thus, according to the seventh embodiment, a portion to be wasted is smaller than that of a conventional case, and a manufacturing process such as a cutting process or a polishing process is simplified. Accordingly, a glass plate that has a high flatness of the main faces and can prevent the main faces from being damaged at the time of a stacking process can be manufactured at low cost.

The width of the curvature correcting areas W22 and W23 may be set appropriately in accordance with a desired flatness of the main faces. For example, the width is set to be in the range of about 20% to 50% of the entire width of the base glass plate 44.

Example 4

A raw base glass plate that is the same as that of Example 3 was prepared, and the raw base glass plate in which spacer portion forming areas are formed by etching up to an area apart from the facets of the raw base glass plate in the width direction by 30 mm so as to have a constant thickness by using an etching method using a hydrofluoric acid solution and the curvature correcting areas were formed by etching up to a width of 200 mm from the spacer portion forming area so as to increase the thickness toward the center portion was prepared. In addition, etching was performed such that the thickness in each end portion became 4.78 mm.

Next, the base glass plate according to this Example 4 was heated and stretched in the same condition as that of Example 3, whereby a glass plate was formed. Then, the thickness of this glass plate was measured, and a difference in the maximum value and the minimum value of the normalized thickness extending from the center portion to the facet located on the center side of the spacer portion was about 0.15.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method of manufacturing a glass plate, the method comprising:
   preparing a base glass plate having tapered portions each extending in a longitudinal direction of the base glass plate and each having in which a thickness between main faces of the base glass plate that increases from a facet of the base glass plate toward a center portion of the base glass plate in a width direction of the base glass plate; and
   softening the base glass plate by heating the base glass plate in a heating furnace to stretch the base glass plate into a glass plate having a desired thickness and a flatness greater than a flatness of the base glass plate, wherein
   the preparing of a base glass plate comprises:
   preparing a raw base glass plate that has main faces parallel to each other; and
   immersing a portion of the raw base glass plate where the tapered portion is to be formed in an etching liquid from a facet of the raw base glass plate in the width direction and etching the raw base glass plate while lowering a liquid surface of the etching liquid.

2. The method of manufacturing a glass plate according to claim 1, wherein the base glass plate has a parallel portion in which the main faces of the base glass plate are parallel to each other between the tapered portions of the base glass plate.

3. The method of manufacturing a glass plate according to claim 1, wherein the preparing of a base glass plate includes:
   preparing test base glass plates, each having tapered portions each of which extends in a longitudinal direction of the test base glass plate and each of which has a thickness between main faces of the test base glass plate that increases from a facet of the test base glass plate toward a center portion of the test base glass plate in a width direction of the test base glass plate; and
   forming test glass plates by heating and stretching the test base glass plates; and
   determining a shape of the tapered portions of the base glass plate based on shapes of the test glass plates.

4. A method of manufacturing a glass plate, the method comprising:
   preparing a base glass plate having tapered from each extending in a longitudinal direction of the base glass plate and each having a thickness between main faces of the base glass plate that increases from a facet of the base glass plate toward a center portion of the base glass plate in a width direction of the base glass plate; and
   softening the base glass plate by heating the base glass plate in a heating furnace to stretch the base glass plate into a glass plate having a desired thickness and a flatness greater than a flatness of the base glass plate, wherein
   the tapered portions of the base glass plate extend up to a center of the base glass plate in the width direction.

5. The method of manufacturing a glass plate according to claim 4, wherein the preparing of a base glass plate comprises:
preparing a raw base glass plate that has main faces parallel to each other; and
immersing a portion of the raw base glass plate where the tapered portion is to be formed in an etching liquid from a facet of the raw base glass plate in the width direction and etching the raw base glass plate while lowering a liquid surface of the etching liquid.

6. The method of manufacturing a glass plate according to claim 4, wherein the preparing of a base glass plate includes:
preparing test base glass plates, each having tapered portions each of which extends in a longitudinal direction of the test base glass plate and each of which has a thickness between main faces of the test base glass plate that increases from a facet of the test base glass plate toward a center portion of the test base glass plate in a width direction of the test base glass plate; and
forming test glass plates by heating and stretching the test base glass plates; and
determining a shape of the tapered portions of the base glass plate based on shapes of the test glass plates.

7. A method of manufacturing a glass plate, the method comprising:
preparing a base glass plate that has
tapered portions each having a thickness between main faces of the base glass plate from an end of the tapered portion toward a center portion of the base glass plate in a width direction of the base glass plate, and
end portions extending in a longitudinal direction of the base glass plate, each of the end portions being formed adjacent to the end of one of the tapered portions and having a width that is constant or increases more gently than the thickness of the adjacent tapered portion from a facet of the base glass plate toward the center portion of the base glass plate in the width direction; and
heating the base glass plate in a heating furnace to soften and stretch the base glass plate into a glass plate having a desired thickness, wherein a central portion in the width direction of the glass plate formed has a flatness greater than that of the base glass plate, and end portions in the width direction of the glass plate formed have a thickness greater than a thickness of the central portion of the glass plate formed.

8. The method of manufacturing a glass plate according to claim 7, wherein, a width of each of the end portions of the base glass plate is in the range of 4% to 40% of the entire width of the base glass plate.

9. The method of manufacturing a glass plate according to claim 7, wherein
the preparing of a base glass plate comprises:
preparing a raw base glass plate that has main faces parallel to each other; and
immersing a portion of the raw base glass plate, where the end portions and the tapered portions are to be formed in an etching liquid from a facet of the raw base glass plate in the width direction and etching the raw base glass plate while lowering a liquid surface of the etching liquid.

10. The method of manufacturing a glass plate according to claim 7, wherein each of the tapered portions extends up to a center of the base glass plate in the width direction.

11. The method of manufacturing a glass plate according to claim 7, wherein the base glass plate has a parallel portion in which the main faces of the base glass plate are parallel to each other between the tapered portions.

\* \* \* \* \*